US011763816B1

(12) United States Patent
Sundararaman et al.

(10) Patent No.: US 11,763,816 B1
(45) Date of Patent: Sep. 19, 2023

(54) NATURAL LANGUAGE PROCESSING POLICIES

(71) Applicant: Amazon Technologies, Inc., Seattle, WA (US)

(72) Inventors: Arunachalam Sundararaman, Redmond, WA (US); Balasubramaniam K Thandu, Sammamish, WA (US); Rajesh Ravindran Nandyaleth, Bellevue, WA (US); Hermilo H Cardenas Juarez, Seattle, WA (US); Ananth Duggirala, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 82 days.

(21) Appl. No.: 17/470,241

(22) Filed: Sep. 9, 2021

Related U.S. Application Data

(63) Continuation of application No. 16/574,927, filed on Sep. 18, 2019, now Pat. No. 11,120,799.

(51) Int. Cl.
    G10L 15/22    (2006.01)
    G10L 15/18    (2013.01)

(52) U.S. Cl.
    CPC .......... *G10L 15/22* (2013.01); *G10L 15/1815* (2013.01); *G10L 2015/223* (2013.01)

(58) Field of Classification Search
    USPC .................................................. 704/1–504
    See application file for complete search history.

(56) References Cited

U.S. PATENT DOCUMENTS

| | | | |
|---|---|---|---|
| 6,519,571 B1 * | 2/2003 | Guheen | G06Q 30/0269 705/14.66 |
| 8,032,409 B1 * | 10/2011 | Mikurak | G06Q 30/00 705/14.39 |
| 9,413,891 B2 | 8/2016 | Dwyer et al. | |
| 9,992,642 B1 * | 6/2018 | Rapp | H04M 1/271 |
| 10,237,137 B2 | 3/2019 | Helvey et al. | |
| 10,645,224 B2 | 5/2020 | Dwyer et al. | |
| 10,706,848 B1 * | 7/2020 | Greene | G10L 15/30 |
| 10,833,947 B2 | 11/2020 | Helvey et al. | |
| 10,978,056 B1 | 4/2021 | Challa et al. | |
| 11,102,624 B2 * | 8/2021 | Rapp | H04M 1/271 |
| 11,120,799 B1 * | 9/2021 | Sundararaman | G06F 40/253 |
| 11,188,376 B1 * | 11/2021 | Alexander | G06F 9/45545 |
| 11,423,451 B1 * | 8/2022 | Chaudhari | G06F 16/638 |
| 11,544,152 B2 * | 1/2023 | Savir | G06F 11/1458 |

(Continued)

*Primary Examiner* — Marcus T Riley
(74) *Attorney, Agent, or Firm* — Lee & Hayes, P.C.

(57) ABSTRACT

Systems and methods for natural language processing policies are disclosed. For example, content such as a response to a user command and/or user input such as a customer review, may be analyzed to determine if the content deviates from one or more content policies and to determine a severity of the content-policy deviation(s). A system may determine a number of content-policy deviations associated with the content and whether the content includes an indicator of a person, such as a pronoun and/or a proper noun. Content that includes multiple content-policy deviations and/or than includes an indicator of a person may be determined to be more severe than other deviated content. Applications associated with deviated content may be ranked and corrective action may be taken based on the ranking.

20 Claims, 10 Drawing Sheets

(56) References Cited

U.S. PATENT DOCUMENTS

| | | | |
|---|---|---|---|
| 2004/0064351 A1* | 4/2004 | Mikurak | G06Q 30/0269 |
| | | | 705/22 |
| 2007/0156269 A1 | 7/2007 | Suryanaraya | |
| 2009/0070103 A1 | 3/2009 | Beggelman et al. | |
| 2010/0010968 A1 | 1/2010 | Redlich et al. | |
| 2010/0145700 A1 | 6/2010 | Kennewick et al. | |
| 2010/0211431 A1 | 8/2010 | Lutnick et al. | |
| 2013/0253910 A1 | 9/2013 | Turner et al. | |
| 2015/0309983 A1 | 10/2015 | Hoover et al. | |
| 2016/0147731 A1* | 5/2016 | Parikh | H04L 67/30 |
| | | | 715/261 |
| 2016/0292445 A1 | 10/2016 | Lindemann | |
| 2017/0154188 A1 | 6/2017 | Meier et al. | |
| 2017/0206064 A1 | 7/2017 | Breazeal et al. | |
| 2017/0243028 A1* | 8/2017 | LaFever | G06F 21/6254 |
| 2017/0300472 A1* | 10/2017 | Parikh | G06F 40/205 |
| 2018/0077025 A1 | 3/2018 | Helvey et al. | |
| 2018/0165554 A1 | 6/2018 | Zhang et al. | |
| 2018/0310144 A1* | 10/2018 | Rapp | H04W 4/14 |
| 2020/0076696 A1 | 3/2020 | Helvey et al. | |

* cited by examiner

NATURAL LANGUAGE PROCESSING POLICIES

CROSS REFERENCE TO RELATED APPLICATIONS

This application is a continuation of and claims priority to U.S. patent application Ser. No. 16/574,927, filed Sep. 18, 2019, entitled "Natural Language Processing Policies", which will issue as U.S. Pat. No. 11,120,799 on Sep. 14, 2021. Application Ser. No. 16/574,927 is expressly incorporated herein by reference in their entirety.

BACKGROUND

Use of electronic devices to perform actions and/or to retrieve information has become common. Electronic devices receive input representing requests to perform actions, and, for example, output audio and text in response to such requests. Described herein are improvements in technology and solutions to technical problems that can be used to, among other things, control output of audio and/or text responses using electronic devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
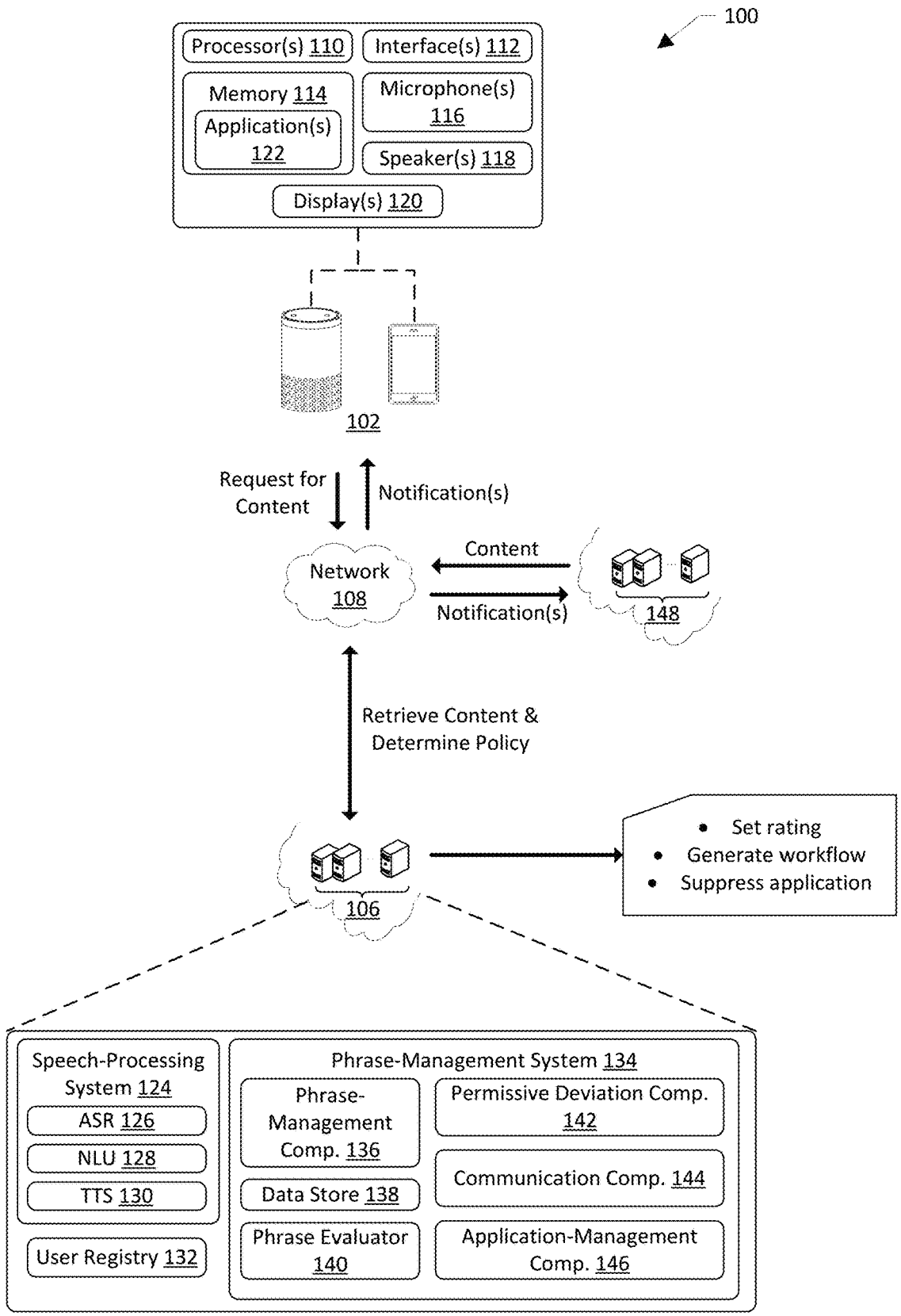
FIG. 1 illustrates a schematic diagram of an example environment for natural language processing policies.

Systems and methods for determining the severity or other degree from which natural language interfaces violate or otherwise deviate from voice user interface policies are disclosed. Take, for example, a room, automobile, or other environment that includes one or more electronic devices such as voice-enabled devices (e.g., Echo devices, mobile phones, tablets, personal computers, etc.). A user of a voice-enabled device may desire for the device to perform an action, such as retrieving desired information, operating smart-home devices, playing music, etc. A user may speak a user utterance requesting information. The electronic device may capture audio representing the user utterance and generate corresponding audio data. The audio data may be processed locally and/or sent to a remote system to determine a response with the requested information. In other examples, the user may provide input, such as touch input to a mobile phone, indicating the request for the information. The remote system may identify an application or other system component capable of providing the information, and query that component for the information. The application may send data representing the requested information and a text-to-speech component of the remote system and/or the device may generate audio data that provides the requested information as synthesized speech. The synthesized speech may be as diverse as language spoken by humans, including language not appropriate for all ages or that may be offensive to some people. Some of language to be output by the electronic device may include phrases that would violate one or more content policies, such as phrases with curse words, inappropriate content, infringing content, etc. These policies can be enabled globally (e.g., always enforced), contextually (e.g., based on who is present at/near the device, environmental factors, time, date, the particular application generating the content to be presented, etc.), and/or due to user configuration (e.g., child mode). In these examples, it would be beneficial to identify when data provided by applications, and/or otherwise utilized by the electronic device, includes these impermissible or otherwise restricted phrases. Additionally, determining the severity of the content-policy violation may be useful for determining one or more actions to be performed in association with the application, such as, for example, censoring of the content, sending a communication to a device associated with the application, blocking use of the application the device and/or an user account associated with the device, and/or categorization of the application.

In examples, a phrase-management component may receive content to be evaluated for content-policy violations. The phrase-management component may receive the content as input and determine if one or more phrases of the content violate one or more content policies. For example, the phrase-management component may determine impermissible phrases and/or phrases that are permissible exceptions of what would otherwise be an impermissible phrase. For example, certain previously-defined impermissible phrases and permissible phrases may be associated with given content types. In these examples, once a content type and/or language indicator is identified for a given client, that content type and/or language indicator may be utilized to identify the impermissible phrases and permissible phrases associated with that content type and/or language indicator. The impermissible phrases may represent phrases that violate one or more policies associated with the application, the client device, the electronic device, and/or the remote system. Such phrases may include curse words, inappropriate and/or explicit content, infringing content, etc. The permissible phrases may be phrases that are associated with the impermissible phrases but are considered permissible. For example, an impermissible phrase may be "drug." An associated permissible phrase may be "drug store," which may be both permissible for a given context and/or category of phrases. Additionally, even when a word may be considered impermissible in given circumstances, when the content is of a given type, such as a literary work, the impermissible phrase may be considered permissible. The phrase-management component may also be utilized to determine phrase-evaluation preferences, such as whether a phrase will be considered an impermissible phrase or a permissible phrase when there is an exact match, a broad-phrase match, a fuzzy match, and/or a phonetic match. In addition to the above, the phrase-management component may also be configured to determine a count of violative phrases. The violative phrases, permissible phrases, count of violative phrases, and/or associated metadata may be stored in a data store to be utilized for violation severity determinations.

Additionally, a phrase evaluator may perform one or more evaluations of the content and/or the results from the phrase-management component to generate additional data to be utilized for violation severity determinations. For example, the phrase evaluator may utilize the content and/or the results from the phrase-management component to determine parts of speech of words of the content. For example, the phrase evaluator may be configured to determine if one or more pronouns are present in the content. If one or more proper nouns are present in the content, the phrase evaluator may be configured to then determine whether the content includes adjectives and/or which nouns are being modified by the adjectives. The phrase evaluator may be configured to determine whether a given word is a noun or a verb, which may be determined based on its disposition in a sentence, for example. Additionally, in examples, the phrase evaluator may be configured to determine if the content includes one or more anaphoras, which are words that refer to or replace a word used earlier in a given sentence and/or a prior sentence. For example, the sentence "Restaurant A has great food, and it is close" includes the anaphora "it" for the word "Restaurant A." The phrase evaluator may generate a JSON document that indicates the determined parts of speech and/or anaphoras. This JSON document may be stored in association with a data store.

Having determined violative phrases, the count of violative phrases, and the parts of speech, a permissive deviation component may query the datastore for some or all of this information. The permissive deviation component may utilize the violative phrases, the count of violative phrases, and/or the parts of speech and/or anaphora determinations to generate data indicating a severity of content-policy violation(s) associated with given content. It should be understood that when content is described herein as violating one or more content policies, such disclosure includes the content deviating from content that is allowable by the content policies and/or content that does not include a permissive exception to the deviation. Determining policy-violation severity may include, for example, determining and/or identifying an initial severity score associated with a first phrase of the content determined to violate a content policy. In these examples, the first phrase may be associated with a static initial severity score or the severity score may be dynamic and may be based at least in part on the phrase at issue. For example, a phrase determined to correspond to a curse word may have a certain initial severity score while a phrase determined to correspond to a potential infringement violation may have a different initial severity score. When infringement violations are described herein, those violations may include violations of intellectual property infringement, for example. In these examples, one or more of the content policies may include prescriptions against the inclusion of content that infringes upon the intellectual property rights of others. By way of further example, phrases corresponding to differing curse words may have varying initial severity scores. The initial severity scores may also be based at least in part on the application from which the content was received and/or a maturity rating associated with the application. For example, a given application associated with healthcare may be more likely to include phrases that would otherwise be considered violative of a content policy if the application was associated with a different application type, such as a children's application. The initial severity scores may be a numerical value, percentage, and/or some other metric and, in examples, may be based at least in part on a scale that indicates a relative severity of the violative phrase. For example, the permissive deviation component may associate an initial severity score of 5 on a scale of 1 to 10 for a given phrase determined to be violative of at least one content policy.

Additionally, the permissive deviation component may be configured to adjust or otherwise change the initial severity score based at least in part on the information queried from the data store. For example, the permissive deviation component may utilize the count of violative phrases to determine whether multiple violative phrases were identified in the content. In examples where at least two violative phrases were identified in the content, the permissive deviation component may be configured to associate a weighting value to the initial severity score. Utilizing the example above, the permissive deviation component may determine that two violative phrases are present with respect to the content, and based at least in part on that determination, the permissive deviation component may increase the initial severity score by, for example, a given percentage. For example, the severity score may be increased by 50% such that the severity score is 7.5 instead of 5. In these examples, the increase in severity score may be based at least in part on the number of violative phrases associated with the content and/or the particular phrases at issue. For example, content having three violative phrases may be associated with a greater severity-score increase than content having two violative phrases. Additionally, content having an additional violative phrase of a first type and/or that is considered more violative than a second type may be associated with a greater severity-score increase.

Additionally, or alternatively, the permissive deviation component may utilize the data associated with the parts of speech and/or anaphoras of the content to determine whether the content includes a pronoun and/or proper noun. In examples where the content includes a pronoun and/or proper noun, the permissive deviation component may be configured to increase the severity score. In these examples, the permissive deviation component may determine that a given violative phrase is being associated with the pronoun and/or proper noun in the content, indicating that the violative phrase is being directed at a person that corresponds to the pronoun and/or proper noun. The permissive deviation component may utilize the anaphora information in a similar way to determine if a violative phrase is being directed to a given person, place, item, etc. By way of example, content corresponding to a user posting may include a curse word and the content may be directing the curse word at a given person. Content such as this may be considered more violative of one or more content policies and the permissive deviation component may account for this by increasing the severity score. Utilizing the example above, the initial severity score of 5 may be weighted based at least in part on the presence of the pronoun and/or proper noun and/or the anaphora. By way of example, the initial severity score may be increased by 20% such that the severity score is 6 instead of 5. In examples where the permissive deviation component determines that multiple violative phrases are present and at least one of the violative phrases are directed to a person and/or entity, the severity score may be weighted more heavily. For example, the initial severity score may be increased incrementally and/or a given weighting value may be identified and applied to the initial severity score. Some or all of this information may be utilized to determine a policy-violation score associated with the content. The permissive deviation component may also be configured to analyze policy-violation scores associated with a given application over a time period to increase or decrease the severity score. For example, if numerous instances of policy violations are determined over many content instances, the severity score may be increased.

An application-management component may receive the policy-violation score and may associated the score with the application from which the content was received and/or directed. The application-management component may also receive additional policy-violation scores associated with one or more other applications. The application-management component may utilize the policy-violation scores to rank the applications from those associated with the most severe content-policy violations to those associated with the least severe content-policy violations. The application-management component may then determine one or more actions to be performed in association with the applications, determining and/or performing actions on the applications with the most severe violations prior to determining and/or performing actions on applications with less severe violations. The application-management component may also utilize the policy-violation score associated with a given application to determine which action to perform in association with the application. For example, the actions may include sending a communication, such as via a communication component, to a device and/or system associated with the application. The communication may indicate that the content violates one or more content policies and request that corrective action be taken.

The actions may additionally, or alternatively, include sending a communication, such as via the communication component, to a user device that requested the content and/or that provided the content. The communication may indicate that the content violates one or more content polices and may include a version of the content with the violative phrase(s) redacted and/or an indication that the content cannot be displayed and/or output because it violates a content policy. The actions may additionally, or alternatively, include updating or otherwise changing a maturity rating associated with the application. For example, an initial maturity rating for a given application may indicate that the application is appropriate for all audiences, including children. Based at least in part on the results from the permissive deviation component, the action may include updating the maturity rating to indicate that the application is not appropriate for children and/or is appropriate for only certain audiences. The action may additionally, or alternatively, include suppressing the application from being utilized by users or a given group of users and/or from being included in a listing of applications available for use. The action may additionally, or alternatively, include generation of a workflow associated with the application. The workflow may include instructions and/or requests for result validation, such as by a developer and/or tester of the application before further action may be initiated utilizing the application.

Additionally, or alternatively, the application-management component may include one or more filters to be utilized prior to, in examples, taking action with respect to a given application. For example, a "cool-off" filter may be utilized to determine whether an action has been taken with respect to an application within a given period of time. If a threshold period of time has not elapsed since a prior action, such as sending a notification, was taken, the system may determine to refrain from taking another action until the threshold period of time has elapsed. In examples, this filter may be utilized for determining when to take an action of the same or a similar type as a prior action and/or the filter may be utilized for determining when to take any action. The threshold period of time may be static, and/or may be based at least in part on the prior action taken, the application that the action is being performed in association with, a number of prior actions taken, an amount of user interaction with the application, and/or other data associated with the content, the application, and/or use of the application. The filters may also include, in examples, a "capacity" filter, which may be utilized to determine the number of applications that may be flagged for actions in a given time period and/or run. The number of applications may be based at least in part on compute usage, user interaction with available applications, a time of day, and/or a day of the week, for example.

Additionally, or alternatively, feedback data may be received from customer devices and/or devices associated with the applications. The feedback data may indicate an accuracy of the determinations of policy violations and/or the presence of multiple violative phrases and/or pronouns and/or proper nouns in the content. This feedback data may be utilized to adjust and/or train one or more models utilized by the phrase-management component, the phrase evaluator, the permissive deviation component, and/or the application-management component. Additional details on the various models utilized by some or all of these components are provided below.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for natural language processing policies. The system 100 may include, for example, an electronic device 102, which may be a voice-enabled device. The electronic device 102 may be configured to receive user utterances and perform operations in response to such user utterances. In these examples, the electronic device 102 may be "hands free" such that interactions with the device are performed through audible requests and responses.

The electronic device 102 may include one or more components, such as, for example, one or more processors 110, one or more network interfaces 112, memory 114, one or more microphones 116, one or more speakers 118, and/or one or more displays 120. The microphones 116 may be configured to capture audio, such as user utterances, and generate corresponding audio data. The speakers 118 may be configured to output audio, such as audio corresponding to audio data received from another device and/or the system 106. It should be understood that while several examples used herein include an electronic device 102 that allows users to interact therewith via user utterances, one or more other devices, which may not include a voice interface, may be utilized instead of or in addition to electronic devices 102. In these examples, the device may be configured to send and receive data over the network 108 and to communicate with other devices in the system 100. As such, in each instance where an electronic device is utilized, a computing device that does not include a voice interface may also or alternatively be used. The displays 120 may be configured to display media, such as text, corresponding to media data and/or input data that may be received, for example, from the remote system 106. The memory 114 may include one or more components such as, for example, one or more applications 122 residing on the memory 114 and/or accessible to the electronic device 102. The applications(s) 122 may be configured to cause the processor(s) 110 to receive information associated with interactions with the electronic device 102 and cause display of representations, such as text and/or images, associated with the interactions. The application(s) 122 may also be utilized, in examples, to receive input, such as from a user of the electronic device 102, and send corresponding data and/or instructions associated with the input to the remote system 106. The application(s) 122 may also be utilized to display notifications and/or alerts received, for example, from the remote system 106. It should be understood that when electronic devices are described herein, those electronic devices may include phones, computers, and/or other computing devices.

The remote system 106 may include components such as, for example, a speech-processing system 124, a user registry 132, and/or a phrase-management system 134. It should be understood that while the speech-processing system 124, the user registry 132, and the phrase-management system 134 are depicted as separate from each other in FIG. 1, some or all of the components may be a part of the same system. The speech-processing system 124 may include an automatic speech recognition component (ASR) 126, a natural language understanding component (NLU) 128, and/or a test-to-speech component (TTS) 130. The phrase-management system 134 may include a phrase-management component 136, a data store 138, a phrase evaluator 140, a permissive deviation component 142, a communication component 144, and/or an application-management component 146. Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills, actions, capsules, and/or any other type of component similar to the applications 122 described with respect to the electronic device 102. For example, a skill may receive data representing an intent. For example, an intent may be determined by the NLU component 128 and/or as determined from user input via a computing device. Skills may be configured to utilize the intent to output data for input to the TTS component 130, a link or other resource locator for audio data, and/or a command to a device, such as the electronic device 102.

In instances where an electronic device 102 is utilized, skills may extend the functionality of accessory devices that can be controlled by user utilizing a voice-user interface. In some examples, skills may be a type of application that may be useable in association with accessory devices and may have been developed specifically to work in connection with given accessory devices. Additionally, skills may be a type of application that may be useable in association with the an electronic device and may have been developed specifically to provide given functionality to the electronic device. In examples, a non-skill application may be an application that does not include the functionality of a skill. Speechlets, as described herein, may be a type of application that may be usable in association with electronic devices and may have been developed specifically to work in connection voice interfaces of with electronic devices. The applications(s) may be configured to cause processor(s) to receive information associated with interactions with the electronic device 102. The application(s) may also be utilized, in examples, to receive input, such as from a user of the electronic device 102, and send data and/or instructions associated with the input to one or more other devices.

The components of the remote system 106 are described in detail below. In examples, some or each of the components of the remote system 106 may include their own processor(s), network interface(s), and/or memory. As such, by way of example, the speech-processing system 124 may include and/or be associated with processor(s), network interface(s), and/or memory. The phrase-management system 134 may include and/or be associated with different processor(s), network interface(s), and/or memory, or one or more of these components may utilize some or all of the same processor(s), network interface(s), and/or memory utilized by the speech-processing system 124. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 132 may be configured to identify, determine, and/or generate associations between users, user accounts, and/or devices. For example, one or more associations between user accounts may be identified, determined, and/or generated by the user registry 132. The user registry 132 may additionally store information indicating one or more applications and/or resources accessible to and/or enabled for a given user account. Additionally, the user registry 132 may include information indicating device identifiers, such as naming identifiers, associated with a given user account, as well as device types associated with the device identifiers. The user registry 132 may also include information indicating user account identifiers, naming indicators of devices associated with user accounts, and/or associations between devices, such as the electronic device 102. The user registry 132 may also include information associated with usage of the electronic devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 124 may be configured to receive audio data from the electronic device 102 and perform speech-processing operations. For example, the ASR component 126 may be configured to generate text data corresponding to the audio data, and the NLU component 128 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "What is the title of this song?," the NLU component 128 may identify a "identify title" intent and the payload may be "this song." In this example where the intent data indicates an intent to provide the title of a song that is currently being output, the speech-processing system 124 may call one or more speechlets to effectuate the intent. Speechlets, as described herein may otherwise be described as applications and may include functionality for utilizing intent data to generate directives and/or instructions. For example, a music speechlet may be called when the intent indicates that an action is to be performed associated with music output by the electronic device 102. The speechlet may be designated as being configured to handle the intent of determining information associated with music, for example. The speechlet may receive the intent data and/or other data associated with the user utterance from the NLU component 128, such as by an orchestrator of the remote system 106, and may perform operations to instruct the electronic device 102 to perform an operation. For example, the music speechlet may retrieve the requested information and may provide that information to the remote system 106. The remote system may utilize text data associated with the requested information to generate audio data, such as by the TTS component 130. The audio data may be sent from the remote system 106 to the electronic device 102 for output of corresponding audio by the speakers 118 of the electronic device 102.

In examples, content to be analyzed for content policy deviation may include content provided by a skill and/or device such as in response to a request for the content. For example, when a skill returns a response to a user request, the skill may provide text that the speech-processing system and/or another system may convert to speech. In some examples, the skill and/or the speech-processing system may control how the speech generated and/or what speech is generated from the text provided in the response. To do so, the speech-processing system and/or skill may utilize a speech synthesis markup language (SSML). SSML is a markup language that may provide a standard way to mark up text for generation of synthetic speech. SSML may utilize tags defined in a SSML specification and those tags may include an indication of what portion of a skill response corresponds to a beginning of speech to be output and what portion of the skill response corresponds to an end of speech to be output. Other tags may include breaks in speech, emphasis, language of choice, prosody, plurality of a word, etc. To utilize SSML, the skill may have constructed speech to be output using the supported SSML tags. In these examples, when a response is received from a skill, the response may indicate that it is using SSML rather than, for example, plain text. The code associated with the response may utilize the SSML tags to show which portions of a response are to be output. This may be done utilizing coding and SSML tags such as, for example:

<speak>
The weather is currently 75 degrees.
</speak>

The speech-processing system may receive the response from the skill and may utilize the SSML tags to determine which portion of the response includes the content to be output. This content is the content that may be analyzed as described herein to determine whether the content deviates from one or more content policies and the severity of the deviation. In other examples where the content comprises audio data, the audio data may be utilized to generate text data, such as by utilized automatic speech recognition techniques as described herein, and that text data may be analyzed to be determine if the text data deviates from the one or more content policies.

The phrase-management component 136 may be configured to receive content to be evaluated for content-policy violations. In examples, the content may be received in response to a request for such content. In other examples, the content may be provided to the speech-processing system for certification of the content as complying with content policies, such as before a skill that provides the content is made publicly available. In these examples, certification of the skill as providing content that complies with content policies may be provided in instances where the results of the processes described herein indicate that the content does not deviate from the content policies and/or that corrective action has been taken in response to a notification that at least a portion of the content deviates from the content policies, such as above a threshold severity. The phrase-management component 136 may receive the content as input and determine if one or more phrases of the content violate one or more content policies. For example, the phrase-management component 136 may determine impermissible phrases and/or phrases that are permissible exceptions of what would otherwise be an impermissible phrase. For example, certain previously-defined impermissible phrases and permissible phrases may be associated with given input-data types and/or language indicators. In these examples, once an input-data type and/or language indicator is identified for a given client, that input-data type and/or language indicator may be utilized to identify the impermissible phrases and permissible phrases associated with that input-data type and/or language indicator. The impermissible phrases may represent phrases that violate one or more policies associated with the application, a client device 148 associated with the application, the electronic device(s) 102, and/or the remote system 106. Such phrases may include curse words, inappropriate and/or explicit content, infringing content, etc. The permissible phrases may be phrases that are associated with the impermissible phrases but are considered permissible. For example, an impermissible phrase may be "drug." An associated permissible phrase may be "drug store," which may be both permissible for a given context and/or category of phrases. Additionally, even when a word may be considered impermissible in given circumstances, when the content is of a given type, such as a literary work, the impermissible phrase may be considered permissible. The phrase-management component 136 may also be utilized to determine phrase-evaluation preferences, such as whether a phrase will be considered an impermissible phrase or a permissible phrase when there is an exact match, a broad-phrase match, a fuzzy match, and/or a phonetic match. In addition to the above, the phrase-management component 136 may also be configured to determine a count of violative phrases. The impermissible phrases, permissible phrases, count of violative phrases, and/or associated metadata may be stored in the data store 138 to be utilized for violation severity determinations for natural language processing.

When determining whether one or more phrases of content violate one or more content policies, the phrase-management component 136 may determine a client identifier associated with the application. The client identifier may be associated with generated queries. Those queries may be retrieved and may be utilized to perform phrase evaluation of the content from the application, as described elsewhere herein. The queries corresponding to the client identifier may be retrieved and may be utilized to determine whether violative or otherwise impermissible phrases and/or permissible phrases are present in the content. For example, the content may be percolated into a percolator query, which may be used to compare with queries stored in the data store 138. The percolator query may contain the content and/or portions of the content. In these examples, the query may include one or more fields, such as a query field used for indexing the query and including a JSON object that represents the query. The query field may be configured as a percolator field type that is configured to store the query in such a way that it can be used to match content defined on the percolator query. The percolator query may be utilized to index the queries associated with the client identifier and percolate the queries to identify which queries match or otherwise correspond to the percolator query. For example, the percolator query may indicate the client identifier for the requested content as well as text data associated with the requested content. Some or all of the queries associated with the client identifier may be utilized to compare the impermissible and permissible phrases associated with those queries and the text data. For example, the queries may indicate one or more impermissible phrases and one or more permissible phrases. The text data may be searched for the impermissible phrases and permissible phrases, and if present, the query associated with the identified impermissible phrases and/or permissible phrases may be identified. The identified query may indicate an association between impermissible phrases and permissible phrases, and that association may be utilized to determine whether an impermissible phrase identified in the content also corresponds to a permissible phrase. In examples where the impermissible phrase corresponds to a permissible phrase, the impermissible phrase may not be censored or otherwise counted as an impermissible phrase. In examples where the impermissible phrase does not correspond to a permissible phrase, the impermissible phrase may be counted as an impermissible phrase and the one or more actions described herein, such as censoring, may be performed.

The phrase evaluator 140 may be configured to perform one or more evaluations of the content and/or the results from the phrase-management component 136 to generate additional data to be utilized for violation severity determinations for natural language processing. For example, the phrase evaluator 140 may utilize the content and/or the results from the phrase-management component 136 to determine parts of speech of words of the content. For example, the phrase evaluator 140 may be configured to determine if one or more pronouns are present in the content, if one or more proper nouns are present in the content, whether the content includes adjectives and/or which nouns are being modified by the adjectives, and/or whether a given word is a noun or a verb, which may be determined based on its disposition in a sentence, for example. Additionally, in examples, the phrase evaluator 140 may be configured to determine if the content includes one or more anaphoras, which are words that refer to or replace a word used earlier in a given sentence and/or a prior sentence. For example, the sentence "Restaurant A has great food, and it is close" includes the anaphora "it" for the word "Restaurant A." The phrase evaluator 140 may generate a JSON document that indicates the determined parts of speech and/or anaphoras. This JSON document may be stored in association with the data store 138.

In examples, the phrase evaluator 140 may be configured to determine whether the indicator of the person is a first-person indicator, a second-person indicator, or a third-person indicator. For example, portions of the content that include "I" and/or "me" may be designated as first-person indicators; portions of the content that include "you" may be designated as second-person indicators; and portions of the content that include a name and/or a pronoun such as "she" and/or "he" may be designated as third-person indicators. In examples where the indicator of the person is a first-person indicator, the policy violation may be determined to be less severe than if the indicator of the person is a second-person indicator and/or a third-person indicator.

Having determined violative phrases, the count of violative phrases, and the parts of speech, the permissive deviation component 142 may be configured to query the datastore 138 for some or all of this information. The permissive deviation component 142 may utilize the violative phrases, the count of violative phrases, and/or the parts of speech and/or anaphora determinations to generate data indicating a severity of content-policy violation(s) associated with given content. Determining policy-violation severity may include, for example, determining and/or identifying an initial severity score associated with a first phrase of the content determined to violate a content policy. In these examples, the first phrase may be associated with a static initial severity score or the severity score may be dynamic and may be based at least in part on the phrase at issue. For example, a phrase determined to correspond to a curse word may have a certain initial severity score while a phrase determined to correspond to a potential infringement violation may have a different initial severity score. By way of further example, phrases corresponding to differing curse words may have varying initial severity scores. The initial severity scores may also be based at least in part on the application from which the content was received and/or a maturity rating associated with the application. For example, a given application associated with healthcare may be more likely to include phrases that would otherwise be considered violative of a content policy if the application was associated with a different application type, such as a children's application. The initial severity scores may be a numerical value, percentage, and/or some other metric and, in examples, may be based at least in part on a scale that indicates a relative severity of the violative phrase. For example, the permissive deviation component 142 may associate an initial severity score of 5 on a scale of 1 to 10 for a given phrase determined to be violative of at least one content policy.

Additionally, the permissive deviation component 142 may be configured to adjust or otherwise change the initial severity score based at least in part on the information queried from the data store 138. For example, the permissive deviation component 142 may utilize the count of violative phrases to determine whether multiple violative phrases were identified in the content. In examples where at least two violative phrases were identified in the content, the permissive deviation component 142 may be configured to associate a weighting value with the initial severity score.

Utilizing the example above, the permissive deviation component 142 may determine that two violative phrases are present with respect to the content, and based at least in part on that determination, the permissive deviation component 142 may increase the initial severity score by, for example, a given percentage. For example, the severity score may be increased by 50% such that the severity score is 7.5 instead of 5. In these examples, the increase in severity score may be based at least in part on the number of violative phrases associated with the content and/or the particular phrases at issue. For example, content having three violative phrases may be associated with a greater severity-score increase than content having two violative phrases. Additionally, content having an additional violative phrase of a first type and/or that is considered more violative than a second type may be associated with a greater severity-score increase.

Additionally, or alternatively, the permissive deviation component 142 may utilize the data associated with the parts of speech and/or anaphoras of the content to determine whether the content includes a pronoun and/or proper noun. In examples where the content includes a pronoun and/or proper noun, the permissive deviation component 142 may be configured to increase the severity score. In these examples, the permissive deviation component 142 may determine that a given violative phrase is being associated with the pronoun and/or proper noun in the content, indicating that the violative phrase is being directed at a person that corresponds to the pronoun and/or proper noun. The permissive deviation component 142 may utilize the anaphora information in a similar way to determine if a violative phrase is being directed to a given person, place, item, etc. By way of example, content corresponding to a user posting may include a curse word and the content may be directing the curse word to a given person. Content such as this may be considered more violative of one or more content policies than content where a violative phrase is not directed to a person, and the permissive deviation component 142 may account for this by increasing the severity score. Utilizing the example above, the initial severity score of 5 may be weighted based at least in part on the presence of the pronoun and/or proper noun and/or the anaphora. By way of example, the initial severity score may be increased by 20% such that the severity score is 6 instead of 5. In examples where the permissive deviation component 142 determines that multiple violative phrases are present and the violative phrases are directed to a person and/or entity, the severity score may be weighted more heavily. For example, the initial severity score may be increased incrementally and/or a given weighting value may be identified and applied to the initial severity score. Some or all of this information may be utilized to determine a policy-violation score associated with the content. The permissive deviation component 142 may also be configured to analyze policy-violation scores associated with a given application over a time period to increase or decrease the severity score. For example, if numerous instances of policy violations are determined over many content instances, the severity score may be increased.

The application-management component 146 may be configured to receive the policy-violation score and may associate the score with the application from which the content was received and/or directed. The application-management component 146 may also receive additional policy-violation scores associated with one or more other applications. The application-management component 146 may utilize the policy-violation scores to rank the applications from those associated with the most severe content-policy violations to those associated with the least severe content-policy violations. The application-management component 146 may then determine one or more actions to be performed in association with the applications, determining and/or performing actions on the applications with the most severe violations prior to determining and/or performing actions on applications with less severe violations. The application-management component 146 may also utilize the policy-violation score associated with a given application to determine which action to perform in association with the application. For example, the actions may include sending a communication, such as via the communication component 144, to the client device 148 associated with the application. The communication may indicate that the content violates one or more content policies and request that corrective action be taken. It should be understood that while one or more operations are described herein as being performed by the client device 148, such as via cloud-based processing, this disclosure includes the operations performed by the client device 148 being performed by the speech-processing system 106 and/or the electronic device 102.

The actions may additionally, or alternatively, include sending a communication, such as via the communication component 144, to a user device 102 that requested the content and/or that provided the content. The communication may indicate that the content violates one or more content polices and may include a version of the content with the violative phrase(s) redacted and/or an indication that the content cannot be displayed and/or output because it violates a content policy. The actions may additionally, or alternatively, include updating or otherwise changing a maturity rating associated with the application. For example, an initial maturity rating for a given application may indicate that the application is appropriate for all audiences, including children. Based at least in part on the results from the permissive deviation component 142, the action may include updating the maturity rating to indicate that the application is not appropriate for children and/or is appropriate for only certain audiences. The action may additionally, or alternatively, include suppressing the application from being utilized by users or a given group of users and/or from being included in a catalog and/or listing of applications available for use. The action may additionally, or alternatively, include generation of a workflow associated with the application. The workflow may include instructions and/or requests for result validation, such as by a developer and/or tester of the application before further action may be initiated utilizing the application.

Additionally, or alternatively, the application-management component 146 may include one or more filters to be utilized prior to, in examples, taking action with respect to a given application. For example, a "cool-off" filter may be utilized to determine whether an action has been taken with respect to an application within a given period of time. If a threshold period of time has not elapsed since a prior action, such as sending a notification, was taken, the application-management component 146 may determine to refrain from taking another action until the threshold period of time has elapsed. In examples, this filter may be utilized for determining when to take an action of the same or a similar type as a prior action and/or the filter may be utilized for determining when to take any action. The threshold period of time may be static, and/or may be based at least in part on the prior action taken, the application that the action is being performed in association with, a number of prior actions taken, an amount of user interaction with the application, and/or other data associated with the content, the application, and/or use of the application. The filters may also include, in examples, a "capacity" filter, which may be utilized to determine the number of applications that may be flagged for actions in a given time period and/or run. The number of applications may be based at least in part on compute usage, user interaction with available applications, a time of day, and/or a day of the week, for example.

Additionally, or alternatively, feedback data may be received from user devices 102, and/or the client device 148 associated with the applications. The feedback data may indicate an accuracy of the determinations of policy violations and/or the presence of multiple violative phrases and/or pronouns and/or proper nouns in the content. This feedback data may be utilized to adjust and/or train one or more models utilized by the phrase-management component, the phrase evaluator, the permissive deviation component, and/or the application-management component. Additional details on the various models utilized by some or all of these components are provided below.

The communication component 144 may be configured to generate and/or send one or more communications to the client device 148 and/or the electronic device 102. For example, the communication component 144 may be configured to generate and/or send a notification to the client device 148 that the application providing input data is associated with input data that includes violative phrases and request that corrective action be taken. The communication component 144 may also be configured to send audio data and/or text data to the electronic device 102 indicating that a response from the application is being censored for violating one or more content policies. The response may also be a censored version of the input data received from the client device 148.

One or more of the components described herein may utilize one or more models to perform the actions described with respect to those components. A model may utilize predictive analytics to predict one or more outcomes. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning. The predictive analytic techniques may be utilized to determine associations and/or relationships between explanatory variables and predicted variables from past occurrences and utilizing these variables to predict an unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. By so doing, a predictive model generator may utilize data from various data stores, as well as sample data, to predict or otherwise determine an outcome. Outcome prediction may be deterministic such that the outcome is determined to occur or not occur. Additionally, or alternatively, the outcome prediction may be probabilistic such that the outcome is determined to occur to a certain probability and/or confidence.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the electronic device 102.

As shown in FIG. 1, several of the components of the remote system 106 and the associated functionality of those components as described herein may be performed by one or more of the electronic device 102. Additionally, or alternatively, some or all of the components and/or functionalities associated with the electronic device 102 may be performed by the remote system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or with the polling system and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110 and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the remote system 106 may possess its own local memory, which also may store program components, program data, and/or one or more operating systems.

The memory 114 and/or the memory described with respect to the components of the remote system 106 may include volatile and nonvolatile memory, removable and non-removable media implemented in any method or technology for storage of information, such as computer-readable instructions, data structures, program component, or other data. Such memory 114 and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or the memory described with respect to the components of the remote system 106 may be implemented as computer-readable storage media ("CRSM"), which may be any available physical media accessible by the processor(s) 110 and/or the processor(s) described with respect to the remote system 106 to execute instructions stored on the memory 114 and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112 and/or the network interface(s) described with respect to the components of the remote system 106 may enable messages between the components and/or devices shown in system 100 and/or with one or more other polling systems, as well as other networked devices. Such network interface(s) 112 and/or the network interface(s) described with respect to the components of the remote system 106 may include one or more network interface controllers (NICs) or other types of transceiver devices to send and receive messages over the network 108.

For instance, each of the network interface(s) 112 and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or the network interface(s) described with respect to the components of the remote system 106 may include a wide area network (WAN) component to enable message over a wide area network.

In some instances, the remote system 106 may be local to an environment associated the electronic devices 102. For instance, the remote system 106 may be located within one or more of the electronic devices 102. In some instances, some or all of the functionality of the remote system 106 may be performed by one or more of the electronic devices 102. Also, while various components of the remote system 106 have been labeled and named in this disclosure and each component has been described as being configured to cause the processor(s) to perform certain operations, it should be understood that the described operations may be performed by some or all of the components and/or other components not specifically illustrated.

Figure 2:
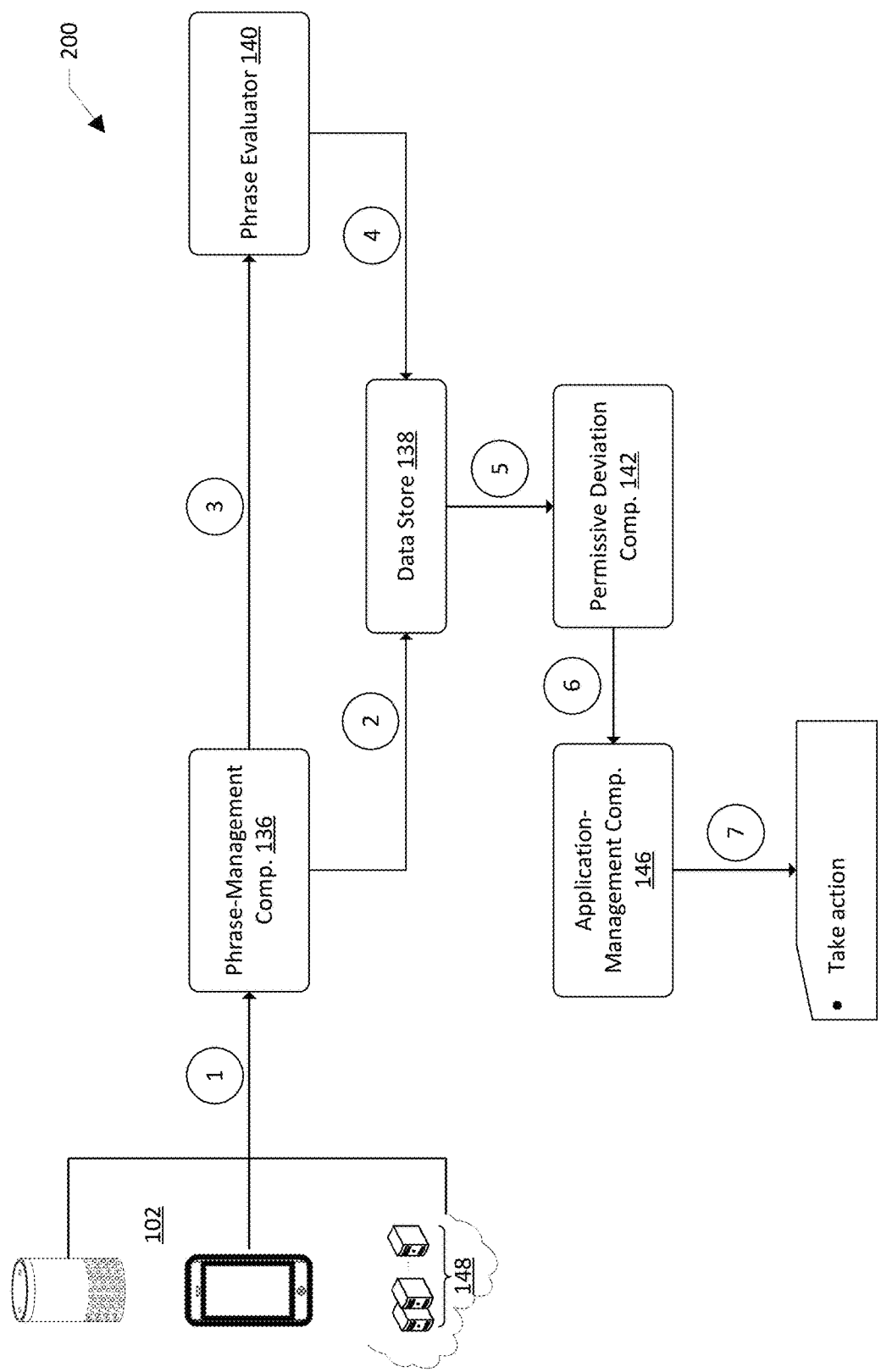
FIG. 2 illustrates a conceptual diagram of example components of a system for natural language processing policies.

FIG. 2 illustrates a conceptual diagram of example components of a system 200 for natural language processing policies. The system 200 may include the same or similar components as the phrase-management system 134 described with respect to FIG. 1. For example, the system 200 may include a phrase-management component 136, a data store 138, a phrase evaluator 140, a permissive deviation component 142, a communication component 144, and/or an application-management component 146. Additionally, one or more of these components may communicate with other devices and/or systems, such as a client device 148 and/or an electronic device 102. FIG. 2 depicts the exchange of information and/or the performance of processes via the various components utilizing steps 1-7. However, it should be understood that the processes may be performed in any order and need not be performed in sequential order as depicted in FIG. 2.

At step 1, content may be received from an electronic device, such as an electronic device 102 and/or a client device 148. The content may be received in response to a request for such content and/or the content may be received directly from one or more of the devices without a request. As described in more detail above, the content may include, for example, information requested by a user of the electronic device 102, metadata, audio data from microphones of the electronic device 102, customer-submitted information such as a customer review and/or a post, comment, or other social-media content, etc.

The phrase-management component 136 may be configured to receive the content to be evaluated for content-policy violations. The phrase-management component 136 may receive the content as input and determine if one or more phrases of the content violate one or more content policies. For example, the phrase-management component 136 may determine impermissible phrases and/or phrases that are permissible exceptions of what would otherwise be an impermissible phrase. For example, certain previously-defined impermissible phrases and permissible phrases may be associated with given input-data types and/or language indicators. In these examples, once an input-data type and/or language indicator is identified for a given client, that input-data type and/or language indicator may be utilized to identify the impermissible phrases and permissible phrases associated with that input-data type and/or language indicator. The impermissible phrases may represent phrases that violate one or more policies associated with the application, a client device 148 associated with the application, the electronic device(s) 102, and/or the remote system 106. Such phrases may include curse words, inappropriate and/or explicit content, infringing content, etc. The permissible phrases may be phrases that are associated with the impermissible phrases but are considered permissible. For example, an impermissible phrase may be "drug." An associated permissible phrase may be "drug store," which may be both permissible for a given context and/or category of phrases. Additionally, even when a word may be considered impermissible in given circumstances, when the content is of a given type, such as a literary work, the impermissible phrase may be considered permissible. The phrase-management component 136 may also be utilized to determine phrase-evaluation preferences, such as whether a phrase will be considered an impermissible phrase or a permissible phrase when there is an exact match, a broad-phrase match, a fuzzy match, and/or a phonetic match. In addition to the above, the phrase-management component 136 may also be configured to determine a count of violative phrases.

When determining whether one or more phrases of content violate one or more content policies, the phrase-management component 136 may determine a client identifier associated with the application. The client identifier may be associated with generated queries. Those queries may be retrieved and may be utilized to perform phrase evaluation of the content from the application, as described elsewhere herein. The queries corresponding to the client identifier may be retrieved and may be utilized to determine whether violative or otherwise impermissible phrases and/or permissible phrases are present in the content. For example, the content may be percolated into a percolator query, which may be used to compare with queries stored in the data store 138. The percolator query may contain the content and/or portions of the content. In these examples, the query may include one or more fields, such as a query field used for indexing the query and including a JSON object that represents the query. The query field may be configured as a percolator field type that is configured to store the query in such a way that it can be used to match content defined on the percolator query. The percolator query may be utilized to index the queries associated with the client identifier and percolate the queries to identify which queries match or otherwise correspond to the percolator query. For example, the percolator query may indicate the client identifier for the requested content as well as text data associated with the requested content. Some or all of the queries associated with the client identifier may be utilized to compare the impermissible and permissible phrases associated with those queries and the text data. For example, the queries may indicate one or more impermissible phrases and one or more permissible phrases. The text data may be searched for the impermissible phrases and permissible phrases, and if present, the query associated with the identified impermissible phrases and/or permissible phrases may be identified. The identified query may indicate an association between impermissible phrases and permissible phrases, and that association may be utilized to determine whether an impermissible phrase identified in the content also corresponds to a permissible phrase. In examples where the impermissible phrase corresponds to a permissible phrase, the impermissible phrase may not be censored or otherwise counted as an impermissible phrase. In examples where the impermissible phrase does not correspond to a permissible phrase, the impermissible phrase may be counted as an impermissible phrase and the one or more actions described herein, such as censoring, may be performed.

At step 2, the impermissible phrases, permissible phrases, count of violative phrases, and/or associated metadata may be sent to and stored in the data store 138 to be utilized for violation severity determinations for natural language processing.

At step 3, the content and/or an instance of the content that was evaluated by the phrase-management component 136 may sent from the phrase-management component 136 to the phrase evaluator 140. In other examples, a version of the content may be sent to the phrase evaluator 140. For example, only a portion of the content, such as the portion corresponding to text data, may be sent to the phrase evaluator 140. The phrase evaluator 140 may be configured to perform one or more evaluations of the content and/or the results from the phrase-management component 136 to generate additional data to be utilized for violation severity determinations for natural language processing. For example, the phrase evaluator 140 may utilize the content and/or the results from the phrase-management component 136 to determine parts of speech of words of the content. For example, the phrase evaluator 140 may be configured to determine if one or more pronouns are present in the content, if one or more proper nouns are present in the content, whether the content includes adjectives and/or which nouns are being modified by the adjectives, and/or whether a given word is a noun or a verb, which may be determined based on its disposition in a sentence, for example. Additionally, in examples, the phrase evaluator 140 may be configured to determine if the content includes one or more anaphoras, which are words that refer to or replace a word used earlier in a given sentence and/or a prior sentence. For example, the sentence "Restaurant A has great food, and it is close" includes the anaphora "it" for the word "Restaurant A."

In examples, the phrase evaluator 140 may be configured to determine whether the indicator of the person is a first-person indicator, a second-person indicator, or a third-person indicator. For example, portions of the content that include "I" and/or "me" may be designated as first-person indicators; portions of the content that include "you" may be designated as second-person indicators; and portions of the content that include a name and/or a pronoun such as "she" and/or "he" may be designated as third-person indicators. In examples where the indicator of the person is a first-person indicator, the policy violation may be determined to be less severe than if the indicator of the person is a second-person indicator and/or a third-person indicator.

At step 4, the phrase evaluator 140 may generate a JSON document that indicates the determined parts of speech and/or anaphoras. This JSON document may be sent to and stored in association with the data store 138.

At step 5, having determined violative phrases, the count of violative phrases, and the parts of speech, the permissive deviation component 142 may be configured to query the datastore 138 for some or all of this information. The permissive deviation component 142 may utilize the violative phrases, the count of violative phrases, and/or the parts of speech and/or anaphora determinations to generate data indicating a severity of content-policy violation(s) associated with given content. Determining policy-violation severity may include, for example, determining and/or identifying an initial severity score associated with a first phrase of the content determined to violate a content policy. In these examples, the first phrase may be associated with a static initial severity score or the severity score may be dynamic and may be based at least in part on the phrase at issue. For example, a phrase determined to correspond to a curse word may have a certain initial severity score while a phrase determined to correspond to a potential infringement violation may have a different initial severity score. By way of further example, phrases corresponding to differing curse words may have varying initial severity scores. The initial severity scores may also be based at least in part on the application from which the content was received and/or a maturity rating associated with the application. For example, a given application associated with healthcare may be more likely to include phrases that would otherwise be considered violative of a content policy if the application was associated with a different application type, such as a children's application. The initial severity scores may be a numerical value, percentage, and/or some other metric and, in examples, may be based at least in part on a scale that indicates a relative severity of the violative phrase. For example, the permissive deviation component 142 may associate an initial severity score of 5 on a scale of 1 to 10 for a given phrase determined to be violative of at least one content policy.

Additionally, the permissive deviation component 142 may be configured to adjust or otherwise change the initial severity score based at least in part on the information queried from the data store 138. For example, the permissive deviation component 142 may utilize the count of violative phrases to determine whether multiple violative phrases were identified in the content. In examples where at least two violative phrases were identified in the content, the permissive deviation component 142 may be configured to associate a weighting value with the initial severity score. Utilizing the example above, the permissive deviation component 142 may determine that two violative phrases are present with respect to the content, and based at least in part on that determination, the permissive deviation component 142 may increase the initial severity score by, for example, a given percentage. For example, the severity score may be increased by 50% such that the severity score is 7.5 instead of 5. In these examples, the increase in severity score may be based at least in part on the number of violative phrases associated with the content and/or the particular phrases at issue. For example, content having three violative phrases may be associated with a greater severity-score increase than content having two violative phrases. Additionally, content having an additional violative phrase of a first type and/or that is considered more violative than a second type may be associated with a greater severity-score increase.

Additionally, or alternatively, the permissive deviation component 142 may utilize the data associated with the parts of speech and/or anaphoras of the content to determine whether the content includes a pronoun and/or proper noun. In examples where the content includes a pronoun and/or proper noun, the permissive deviation component 142 may be configured to increase the severity score. In these examples, the permissive deviation component 142 may determine that a given violative phrase is being associated with the pronoun and/or proper noun in the content, indicating that the violative phrase is being directed at a person that corresponds to the pronoun and/or proper noun. The permissive deviation component 142 may utilize the anaphora information in a similar way to determine if a violative phrase is being directed to a given person, place, item, etc. By way of example, content corresponding to a user posting may include a curse word and the content may be directing the curse word to a given person. Content such as this may be considered more violative of one or more content policies than content where a violative phrase is not directed to a person, and the permissive deviation component 142 may account for this by increasing the severity score. Utilizing the example above, the initial severity score of 5 may be weighted based at least in part on the presence of the pronoun and/or proper noun and/or the anaphora. By way of example, the initial severity score may be increased by 20% such that the severity score is 6 instead of 5. In examples where the permissive deviation component 142 determines that multiple violative phrases are present and the violative phrases are directed to a person and/or entity, the severity score may be weighted more heavily. For example, the initial severity score may be increased incrementally and/or a given weighting value may be identified and applied to the initial severity score. Some or all of this information may be utilized to determine a policy-violation score associated with the content. The permissive deviation component 142 may also be configured to analyze policy-violation scores associated with a given application over a time period to increase or decrease the severity score. For example, if numerous instances of policy violations are determined over many content instances, the severity score may be increased.

At step 6, the application-management component 146 may be configured to receive the policy-violation score and may associate the score with the application from which the content was received and/or directed. The application-management component 146 may also receive additional policy-violation scores associated with one or more other applications. The application-management component 146 may utilize the policy-violation scores to rank the applications from those associated with the most severe content-policy violations to those associated with the least severe content-policy violations.

At step 7, the application-management component 146 may then determine one or more actions to be performed in association with the applications, determining and/or performing actions on the applications with the most severe violations prior to determining and/or performing actions on applications with less severe violations. The application-management component 146 may also utilize the policy-violation score associated with a given application to determine which action to perform in association with the application. For example, the actions may include sending a communication, such as via the communication component 144, to the client device 148 associated with the application. The communication may indicate that the content violates one or more content policies and request that corrective action be taken.

The actions may additionally, or alternatively, include sending a communication, such as via the communication component 144, to a user device 102 that requested the content and/or that provided the content. The communication may indicate that the content violates one or more content polices and may include a version of the content with the violative phrase(s) redacted and/or an indication that the content cannot be displayed and/or output because it violates a content policy. The actions may additionally, or alternatively, include updating or otherwise changing a maturity rating associated with the application. For example, an initial maturity rating for a given application may indicate that the application is appropriate for all audiences, including children. Based at least in part on the results from the permissive deviation component 142, the action may include updating the maturity rating to indicate that the application is not appropriate for children and/or is appropriate for only certain audiences. The action may additionally, or alternatively, include suppressing the application from being utilized by users or a given group of users and/or from being included in a catalog and/or listing of applications available for use. The action may additionally, or alternatively, include generation of a workflow associated with the application. The workflow may include instructions and/or requests for result validation, such as by a developer and/or tester of the application before further action may be initiated utilizing the application.

Additionally, or alternatively, the application-management component 146 may include one or more filters to be utilized prior to, in examples, taking action with respect to a given application. For example, a "cool-off" filter may be utilized to determine whether an action has been taken with respect to an application within a given period of time. If a threshold period of time has not elapsed since a prior action, such as sending a notification, was taken, the application-management component 146 may determine to refrain from taking another action until the threshold period of time has elapsed. In examples, this filter may be utilized for determining when to take an action of the same or a similar type as a prior action and/or the filter may be utilized for determining when to take any action. The threshold period of time may be static, and/or may be based at least in part on the prior action taken, the application that the action is being performed in association with, a number of prior actions taken, an amount of user interaction with the application, and/or other data associated with the content, the application, and/or use of the application. The filters may also include, in examples, a "capacity" filter, which may be utilized to determine the number of applications that may be flagged for actions in a given time period and/or run. The number of applications may be based at least in part on compute usage, user interaction with available applications, a time of day, and/or a day of the week, for example.

FIGS. 3-8 illustrates processes for natural language processing policies. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 9, although the processes may be implemented in a wide variety of other environments, architectures and systems.

Figure 3:
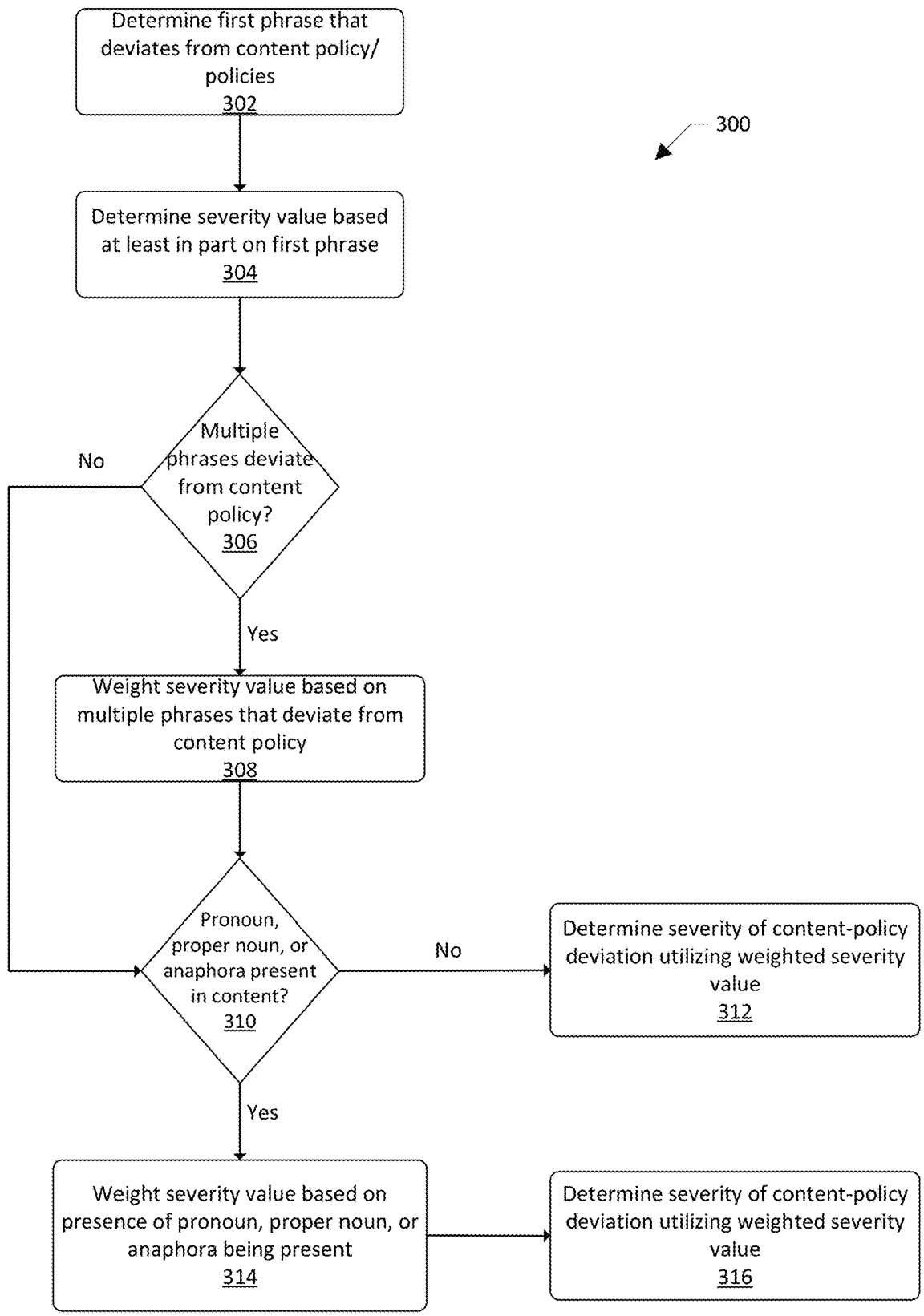
FIG. 3 illustrates a flow diagram of an example process for weighting violative phrases.

FIG. 3 illustrates a flow diagram of an example process 300 for weighting violative phrases. The order in which the operations or steps are described is not intended to be construed as a limitation, and any number of the described operations may be combined in any order and/or in parallel to implement process 300.

At block 302, the process 300 may include determining a first phrase that deviates from one or more content policies.

For example, a phrase-management component may be configured to receive content to be evaluated for content-policy violations. The phrase-management component may receive the content as input and determine if one or more phrases of the content violate one or more content policies. For example, the phrase-management component may determine impermissible phrases and/or phrases that are permissible exceptions of what would otherwise be an impermissible phrase. For example, certain previously-defined impermissible phrases and permissible phrases may be associated with given input-data types and/or language indicators. In these examples, once an input-data type and/or language indicator is identified for a given client, that input-data type and/or language indicator may be utilized to identify the impermissible phrases and permissible phrases associated with that input-data type and/or language indicator. The impermissible phrases may represent phrases that violate one or more policies associated with the application, a client device associated with the application, electronic device(s), and/or a remote system. Such phrases may include curse words, inappropriate and/or explicit content, infringing content, etc. The permissible phrases may be phrases that are associated with the impermissible phrases but are considered permissible. For example, an impermissible phrase may be "drug." An associated permissible phrase may be "drug store," which may be both permissible for a given context and/or category of phrases. Additionally, even when a word may be considered impermissible in given circumstances, when the content is of a given type, such as a literary work, the impermissible phrase may be considered permissible. The phrase-management component may also be utilized to determine phrase-evaluation preferences, such as whether a phrase will be considered an impermissible phrase or a permissible phrase when there is an exact match, a broad-phrase match, a fuzzy match, and/or a phonetic match. In addition to the above, the phrase-management component may also be configured to determine a count of violative phrases.

When determining whether one or more phrases of content violate one or more content policies, the phrase-management component may determine a client identifier associated with the application. The client identifier may be associated with generated queries. Those queries may be retrieved and may be utilized to perform phrase evaluation of the content from the application, as described elsewhere herein. The queries corresponding to the client identifier may be retrieved and may be utilized to determine whether violative or otherwise impermissible phrases and/or permissible phrases are present in the content. For example, the content may be percolated into a percolator query, which may be used to compare with queries stored in the data store. The percolator query may contain the content and/or portions of the content. In these examples, the query may include one or more fields, such as a query field used for indexing the query and including a JSON object that represents the query. The query field may be configured as a percolator field type that is configured to store the query in such a way that it can be used to match content defined on the percolator query. The percolator query may be utilized to index the queries associated with the client identifier and percolate the queries to identify which queries match or otherwise correspond to the percolator query. For example, the percolator query may indicate the client identifier for the requested content as well as text data associated with the requested content. Some or all of the queries associated with the client identifier may be utilized to compare the impermissible and permissible phrases associated with those queries and the text data. For example, the queries may indicate one or more impermissible phrases and one or more permissible phrases. The text data may be searched for the impermissible phrases and permissible phrases, and if present, the query associated with the identified impermissible phrases and/or permissible phrases may be identified. The identified query may indicate an association between impermissible phrases and permissible phrases, and that association may be utilized to determine whether an impermissible phrase identified in the content also corresponds to a permissible phrase. In examples where the impermissible phrase corresponds to a permissible phrase, the impermissible phrase may not be censored or otherwise counted as an impermissible phrase. In examples where the impermissible phrase does not correspond to a permissible phrase, the impermissible phrase may be counted as an impermissible phrase and the one or more actions described herein, such as censoring, may be performed.

At block 304, the process 300 may include determining a severity value of the first phrase. For example, determining policy-violation severity may include determining and/or identifying an initial severity score associated with a first phrase of the content determined to violate a content policy. In these examples, the first phrase may be associated with a static initial severity score or the severity score may be dynamic and may be based at least in part on the phrase at issue. For example, a phrase determined to correspond to a curse word may have a certain initial severity score while a phrase determined to correspond to a potential infringement violation may have a different initial severity score. By way of further example, phrases corresponding to differing curse words may have varying initial severity scores. The initial severity scores may also be based at least in part on the application from which the content was received and/or a maturity rating associated with the application. For example, a given application associated with healthcare may be more likely to include phrases that would otherwise be considered violative of a content policy if the application was associated with a different application type, such as a children's application. The initial severity scores may be a numerical value, percentage, and/or some other metric and, in examples, may be based at least in part on a scale that indicates a relative severity of the violative phrase. For example, the permissive deviation component may associate an initial severity score of 5 on a scale of 1 to 10 for a given phrase determined to be violative of at least one content policy.

At block 306, the process 300 may include determining whether the content includes multiple phrases indicated to deviate from of the one or more content policies. This may be performed in the same or a similar manner as described above with respect to determining that the first phrase violated the one or more content policies. In examples, the permissive deviation component may receive a count of violative phrases from the phrase-management component, and that count may be utilized to determine whether the content includes multiple phrases indicated to be violative of the one or more content polices.

If more than one phrase for given content is determined to violate the one or more content policies, then at block 308 the process 300 may include weighting the severity value based at least in part on the presence of multiple content-policy deviations. For example, the permissive deviation component may be configured to adjust or otherwise change the initial severity score based at least in part on the information queried from the data store. In examples where at least two violative phrases were identified in the content, the permissive deviation component may be configured to associate a weighting value and/or weighting factor with the initial severity score. Utilizing the example above, the permissive deviation component may determine that two violative phrases are present with respect to the content, and based at least in part on that determination, the permissive deviation component may increase the initial severity score by, for example, a given percentage. For example, the severity score may be increased by 50% such that the severity score is 7.5 instead of 5. In these examples, the increase in severity score may be based at least in part on the number of violative phrases associated with the content and/or the particular phrases at issue. For example, content having three violative phrases may be associated with a greater severity-score increase than content having two violative phrases. Additionally, content having an additional violative phrase of a first type and/or that is considered more violative than a second type may be associated with a greater severity-score increase.

If only one phrase for the given content is determined to deviate from the one or more content policies, then the process 300 may continue to block 310.

At block 310, the process 300 may include determining whether a pronoun, proper noun, and/or anaphora are present in the content. For example, the content and/or an instance of the content that was evaluated by the phrase-management component may sent from the phrase-management component to the phrase evaluator. In other examples, a version of the content may be sent to the phrase evaluator. For example, only a portion of the content, such as the portion corresponding to text data, may be sent to the phrase evaluator. The phrase evaluator may be configured to perform one or more evaluations of the content and/or the results from the phrase-management component to generate additional data to be utilized for violation severity determinations for natural language processing. For example, the phrase evaluator may utilize the content and/or the results from the phrase-management component to determine parts of speech of words of the content. For example, the phrase evaluator may be configured to determine if one or more pronouns are present in the content, if one or more proper nouns are present in the content, whether the content includes adjectives and/or which nouns are being modified by the adjectives, and/or whether a given word is a noun or a verb, which may be determined based on its disposition in a sentence, for example. Additionally, in examples, the phrase evaluator may be configured to determine if the content includes one or more anaphoras, which are words that refer to or replace a word used earlier in a given sentence and/or a prior sentence. For example, the sentence "Restaurant A has great food, and it is close" includes the anaphora "it" for the word "Restaurant A."

In examples, the phrase evaluator may be configured to determine whether the indicator of the person is a first-person indicator, a second-person indicator, or a third-person indicator. For example, portions of the content that include "I" and/or "me" may be designated as first-person indicators; portions of the content that include "you" may be designated as second-person indicators; and portions of the content that include a name and/or a pronoun such as "she" and/or "he" may be designated as third-person indicators. In examples where the indicator of the person is a first-person indicator, the policy violation may be determined to be less severe than if the indicator of the person is a second-person indicator and/or a third-person indicator.

If the indicator of the person is not present in the content, then at block 312 the process 300 may include determining a policy-deviation severity score associated with the content based at least in part on the initial severity score determined at block 304 and, in examples where the content includes multiple deviated phrases, the weighting factor associated with the presence of multiple deviated phrases.

If the indicator of the person is present in the content, then at block 314 the process 300 may include weighting the severity score based at least in part on the content including a pronoun, proper noun, and/or anaphora. For example, the permissive deviation component may utilize the data associated with the parts of speech and/or anaphoras of the content to determine whether the content includes a pronoun and/or proper noun. In examples where the content includes a pronoun and/or proper noun, the permissive deviation component may be configured to increase the severity score. In these examples, the permissive deviation component may determine that a given violative phrase is being associated with the pronoun and/or proper noun in the content, indicating that the violative phrase is being directed at a person that corresponds to the pronoun and/or proper noun. The permissive deviation component may utilize the anaphora information in a similar way to determine if a violative phrase is being directed to a given person, place, item, etc. By way of example, content corresponding to a user posting may include a curse word and the content may be directing the curse word to a given person. Content such as this may be considered more violative of one or more content policies than content where a violative phrase is not directed to a person, and the permissive deviation component may account for this by increasing the severity score. Utilizing the example above, the initial severity score of 5 may be weighted based at least in part on the presence of the pronoun and/or proper noun and/or the anaphora. By way of example, the initial severity score may be increased by 20% such that the severity score is 6 instead of 5.

At block 316, the process 300 may include determining the policy-deviation severity score associated with the content based at least in part on the initial severity score determined at block 304, the weighting factor associated with the presence of multiple deviated phrases, if applicable, and the weighting factor associated with the presence of the person indicator. For example, where the permissive deviation component determines that multiple violative phrases are present and the violative phrases are directed to a person and/or entity, the severity score may be weighted more heavily. For example, the initial severity score may be increased incrementally and/or a given weighting value may be identified and applied to the initial severity score. Some or all of this information may be utilized to determine a policy-violation score associated with the content. The permissive deviation component may also be configured to analyze policy-violation scores associated with a given application over a time period to increase or decrease the severity score. For example, if numerous instances of policy violations are determined over many content instances, the severity score may be increased.

Figure 4:
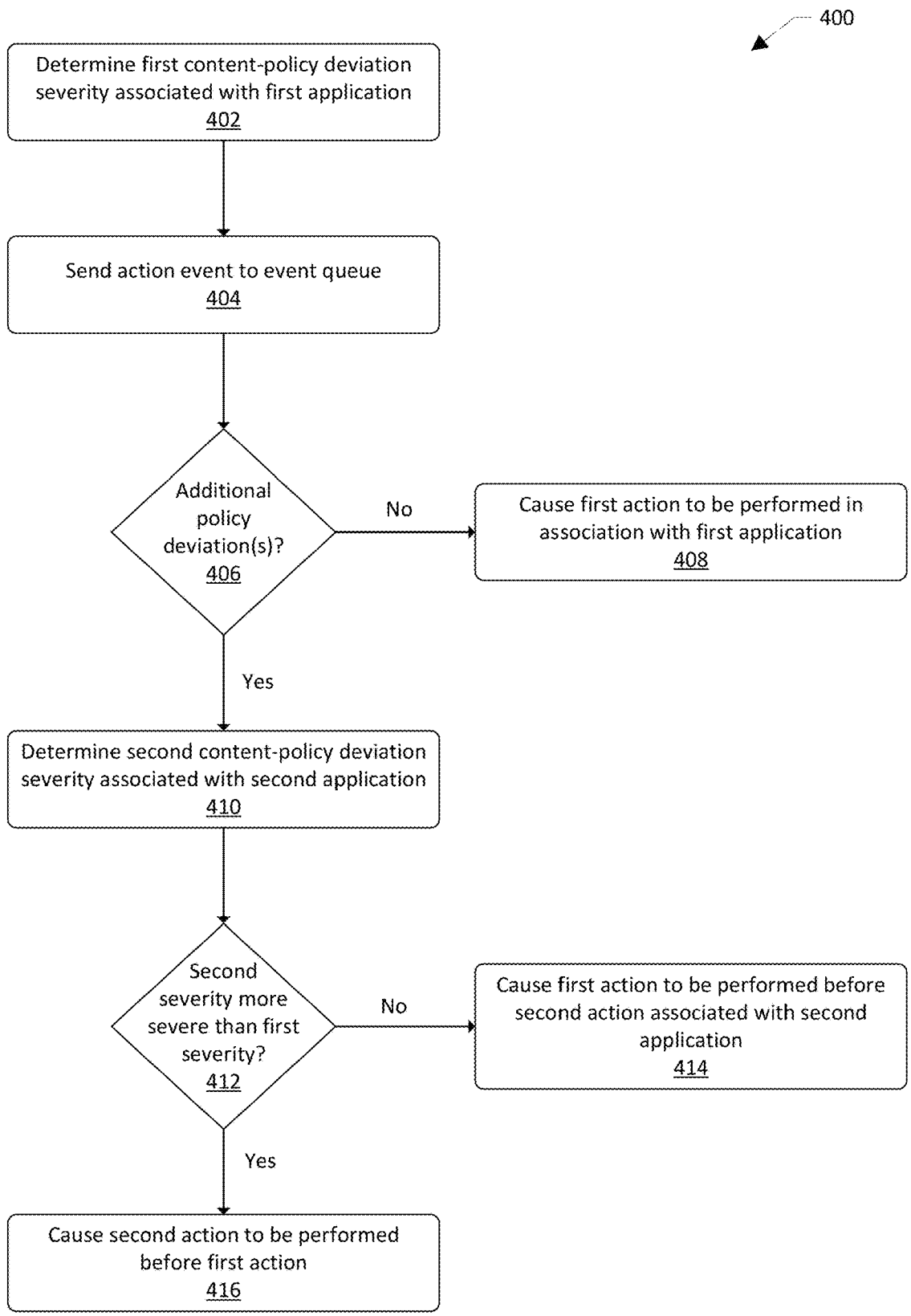
FIG. 4 illustrates a flow diagram of an example process for ranking applications to be acted on based on policy-violation severity.

FIG. 4 illustrates a flow diagram of an example process 400 for ranking applications to be acted on based on policy deviation severity. The order in which the operations or steps are described is not intended to be construed as a limitation, and any number of the described operations may be combined in any order and/or in parallel to implement process 400.

At block 402, the process 400 may include determining a first policy-deviation score associated with a first application. For example, a permissive deviation component may utilize the violative phrases, the count of violative phrases, and/or the parts of speech and/or anaphora determinations to generate data indicating a severity of content-policy violation(s) associated with given content. Determining policy-violation severity may include, for example, determining and/or identifying an initial severity score associated with a first phrase of the content determined to violate a content policy. In these examples, the first phrase may be associated with a static initial severity score or the severity score may be dynamic and may be based at least in part on the phrase at issue. For example, a phrase determined to correspond to a curse word may have a certain initial severity score while a phrase determined to correspond to a potential infringement violation may have a different initial severity score. By way of further example, phrases corresponding to differing curse words may have varying initial severity scores. The initial severity scores may also be based at least in part on the application from which the content was received and/or a maturity rating associated with the application. For example, a given application associated with healthcare may be more likely to include phrases that would otherwise be considered violative of a content policy if the application was associated with a different application type, such as a children's application. The initial severity scores may be a numerical value, percentage, and/or some other metric and, in examples, may be based at least in part on a scale that indicates a relative severity of the violative phrase. For example, the permissive deviation component may associate an initial severity score of 5 on a scale of 1 to 10 for a given phrase determined to be violative of at least one content policy.

Additionally, the permissive deviation component may be configured to adjust or otherwise change the initial severity score based at least in part on the information queried from the data store. For example, the permissive deviation component may utilize the count of violative phrases to determine whether multiple violative phrases were identified in the content. In examples where at least two violative phrases were identified in the content, the permissive deviation component may be configured to associate a weighting value with the initial severity score. Utilizing the example above, the permissive deviation component may determine that two violative phrases are present with respect to the content, and based at least in part on that determination, the permissive deviation component may increase the initial severity score by, for example, a given percentage. For example, the severity score may be increased by 50% such that the severity score is 7.5 instead of 5. In these examples, the increase in severity score may be based at least in part on the number of violative phrases associated with the content and/or the particular phrases at issue. For example, content having three violative phrases may be associated with a greater severity-score increase than content having two violative phrases. Additionally, content having an additional violative phrase of a first type and/or that is considered more violative than a second type may be associated with a greater severity-score increase.

Additionally, or alternatively, the permissive deviation component may utilize the data associated with the parts of speech and/or anaphoras of the content to determine whether the content includes a pronoun and/or proper noun. In examples where the content includes a pronoun and/or proper noun, the permissive deviation component may be configured to increase the severity score. In these examples, the permissive deviation component may determine that a given violative phrase is being associated with the pronoun and/or proper noun in the content, indicating that the violative phrase is being directed at a person that corresponds to the pronoun and/or proper noun. The permissive deviation component may utilize the anaphora information in a similar way to determine if a violative phrase is being directed to a given person, place, item, etc. By way of example, content corresponding to a user posting may include a curse word and the content may be directing the curse word to a given person. Content such as this may be considered more violative of one or more content policies than content where a violative phrase is not directed to a person, and the permissive deviation component may account for this by increasing the severity score. Utilizing the example above, the initial severity score of 5 may be weighted based at least in part on the presence of the pronoun and/or proper noun and/or the anaphora. By way of example, the initial severity score may be increased by 20% such that the severity score is 6 instead of 5. In examples where the permissive deviation component determines that multiple violative phrases are present and the violative phrases are directed to a person and/or entity, the severity score may be weighted more heavily. For example, the initial severity score may be increased incrementally and/or a given weighting value may be identified and applied to the initial severity score. Some or all of this information may be utilized to determine a policy-violation score associated with the content. The permissive deviation component may also be configured to analyze policy-violation scores associated with a given application over a time period to increase or decrease the severity score. For example, if numerous instances of policy violations are determined over many content instances, the severity score may be increased.

At block 404, the process 400 may include sending an action event to an event queue. For example, an application-management component may be configured to receive the policy-violation score and may associate the score with the application from which the content was received and/or directed. The application-management component may then determine one or more actions to be performed in association with the applications. The application-management component may also utilize the policy-violation score associated with a given application to determine which action to perform in association with the application. For example, the actions may include sending a communication, such as via a communication component, to a client device associated with the application. The communication may indicate that the content violates one or more content policies and request that corrective action be taken.

The actions may additionally, or alternatively, include sending a communication, such as via the communication component, to a user device that requested the content and/or that provided the content. The communication may indicate that the content violates one or more content polices and may include a version of the content with the violative phrase(s) redacted and/or an indication that the content cannot be displayed and/or output because it violates a content policy. The actions may additionally, or alternatively, include updating or otherwise changing a maturity rating associated with the application. For example, an initial maturity rating for a given application may indicate that the application is appropriate for all audiences, including children. Based at least in part on the results from the permissive deviation component, the action may include updating the maturity rating to indicate that the application is not appropriate for children and/or is appropriate for only certain audiences. The action may additionally, or alternatively, include suppressing the application from being utilized by users or a given group of users and/or from being included in a catalog and/or listing of applications available for use. The action may additionally, or alternatively, include generation of a workflow associated with the application. The workflow may include instructions and/or requests for result validation, such as by a developer and/or tester of the application before further action may be initiated utilizing the application. An action event may be generated for these actions, and the action event may be stored in association with the event queue.

At block 406, the process 400 may include determining whether additional policy deviations have been determined with respect to one or more other applications. For example, the action-management component may be configured to generate action events for additional applications that are associated with content determined to be violative of the one or more content policies.

If no additional policy violations were determined with respect to the one or more other applications, then at block 408 the process 400 may include causing the first action to be performed in association with the first application. As noted above, causing the first action to be performed may include sending a notification, generating a workflow, updating and/or changing a maturity rating associated with the application, and/or suppressing the application from use.

If additional policy violations were determined with respect to at least one other application, then at block 410 the process 400 may include determining a second policy-deviation score associated with a second application. Additional policy-violation scores associated with other applications may also be determined. Determining the second and subsequent policy-violation scores may be performed in the same or a similar manner as described with respect to block 402.

At block 412, the process 400 may include determining whether the second policy-deviation score, or the other policy-deviation scores, indicate more severity than the first policy-deviation score. For example, the policy-violation scores may be associated with a scale, such as a 1 to 10 scale where higher scores indicate more severe policy violations as described herein. Those applications associated with higher scores may be determined to be more violative of the one or more content policies than applications associated with lower scores. It should be understood that the scales used herein are by way of example and should not be considered a limitation.

If the second, or other, policy-violation score indicates less severity than the first policy-violation score, then at block 414 the process 400 may include causing the first action to be performed prior to causing the second action to be performed in association with the second application. Causing the first action to be performed may be similar to causing the first action to be performed as described with respect to block 408.

If the second, or other policy-violation score indicates more severity than the first policy-violation score, then at block 416 the process 400 may include causing the second action to be performed prior to causing the first action to be performed.

Figure 5:
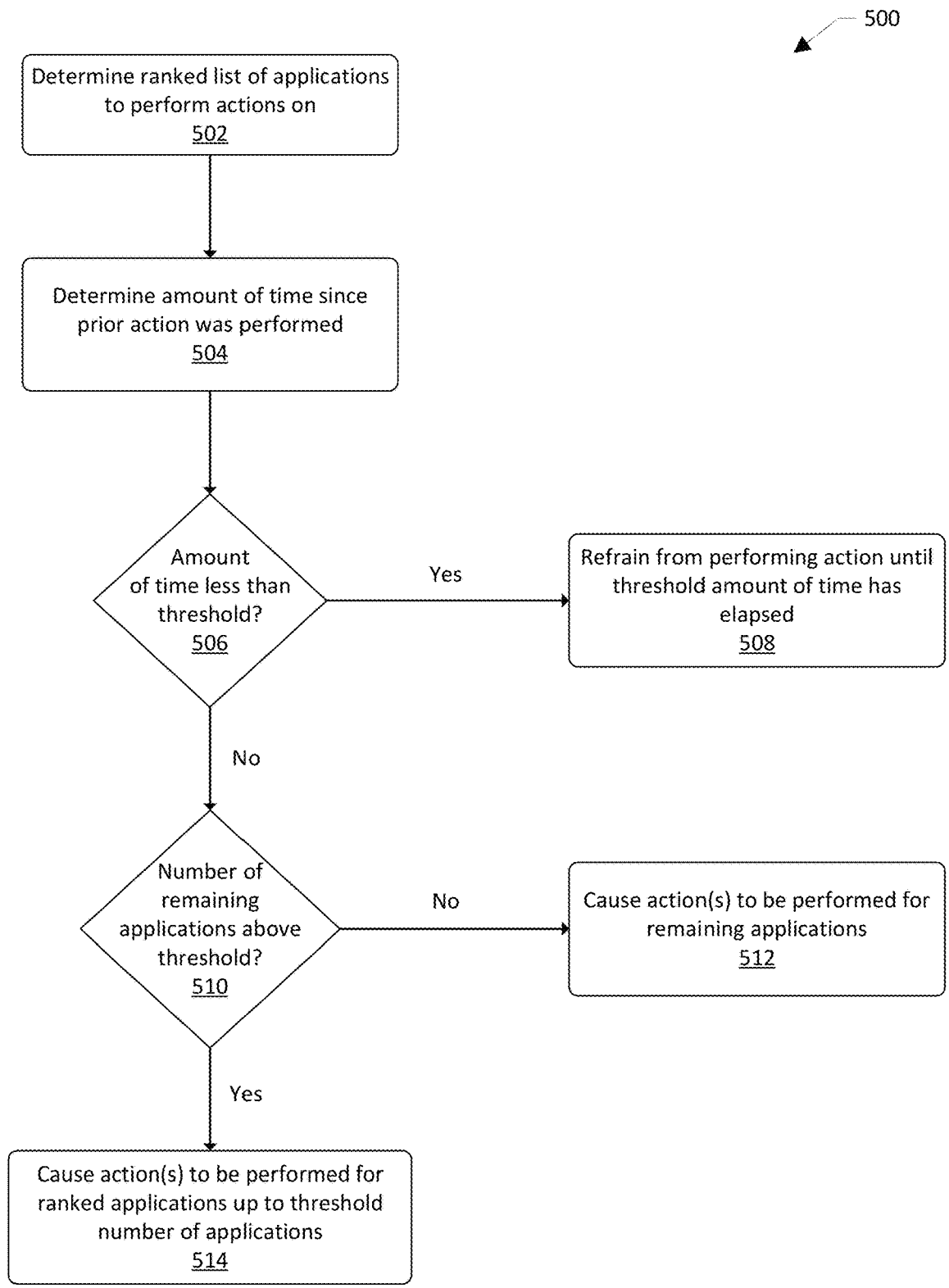
FIG. 5 illustrates a flow diagram of an example process for filtering applications to be acted upon.

FIG. 5 illustrates a flow diagram of an example process 500 for filtering applications to be acted upon. The order in which the operations or steps are described is not intended to be construed as a limitation, and any number of the described operations may be combined in any order and/or in parallel to implement process 500.

At block 502, the process 500 may include determining a ranked list of applications to perform actions on. For example, an application-management component may utilize policy-violation scores associated with the applications to rank those applications from those associated with the most severe content-policy violations to those associated with the least severe content-policy violations.

At block 504, the process 500 may include determining an amount of time since a prior action was performed. For example, a "cool-off" filter may be utilized to determine whether an action has been taken with respect to an application within a given period of time. n examples, this filter may be utilized for determining when to take an action of the same or a similar type as a prior action and/or the filter may be utilized for determining when to take any action. The threshold period of time may be static, and/or may be based at least in part on the prior action taken, the application that the action is being performed in association with, a number of prior actions taken, an amount of user interaction with the application, and/or other data associated with the content, the application, and/or use of the application.

At block 506, the process 500 may include determining whether the amount of time is less than a threshold amount of time. In examples where the amount of time is less than the threshold amount of time, at block 508 the process 500 may include refraining performing the action until the threshold amount of time has elapsed from when the prior action was taken.

In examples where the amount of time is more than the threshold amount of time, at block 510 the process 500 may include determining whether a number of remaining applications to be acted upon is greater than a threshold number of applications. This may be described as a "capacity" filter, which may be utilized to determine the number of applications that may be flagged for actions in a given time period and/or run. The number of applications may be based at least in part on compute usage, user interaction with available applications, a time of day, and/or a day of the week, for example.

Where the number of remaining applications is less than the threshold number of applications, at block 512 the process 500 may include causing the one or more actions to be performed for remaining applications.

Where the number of remaining applications is greater than the threshold number of applications, at block 514 the process 500 may include causing the one or more actions to be performed in a ranked manner such that the applications associated with the more severity violations are performed prior to applications with less severe violations until the number of applications acted upon reaches the threshold number of applications. Those applications that were not acted on may remain in the event queue for later action and/or those applications may be associated with a weighting value indicating a preference for performance of those actions in a subsequent run of action events by the system.

Figure 6:
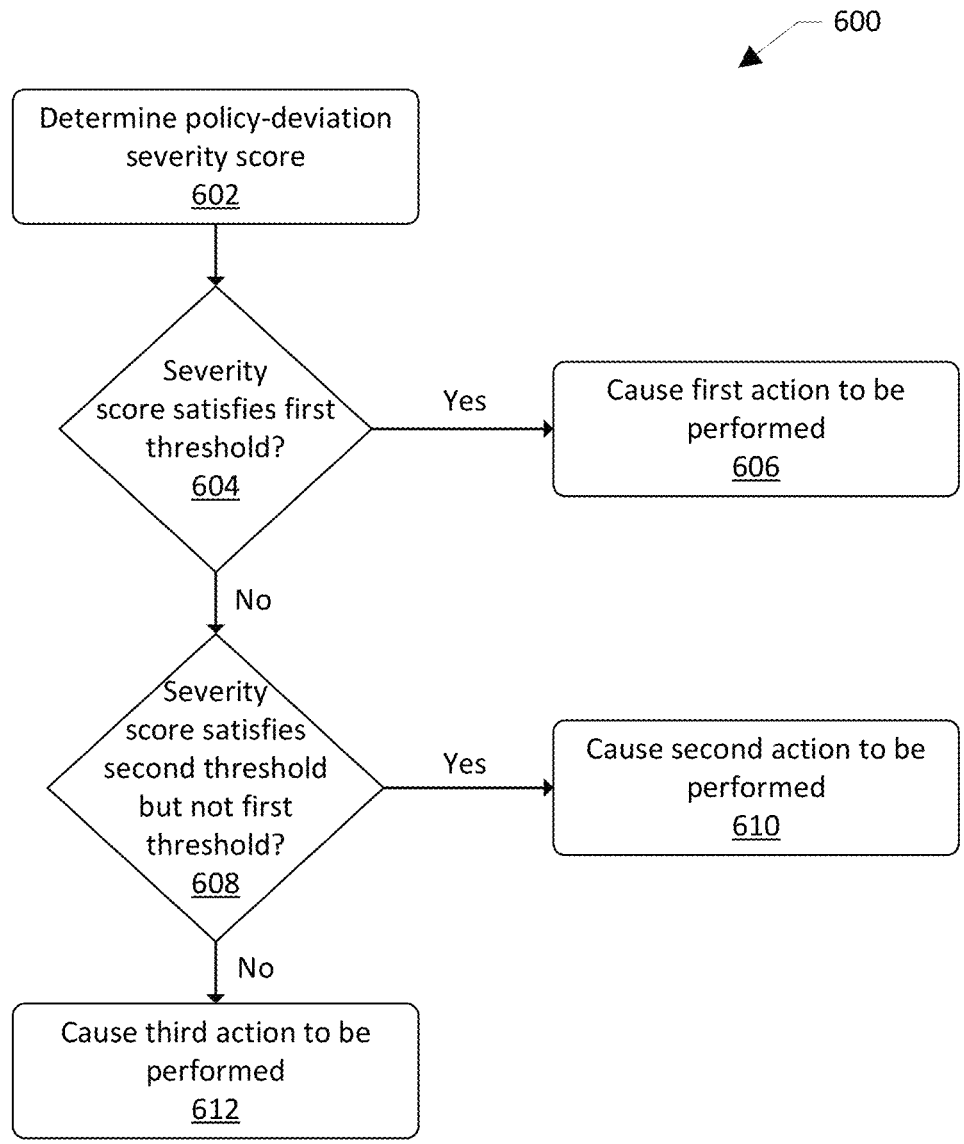
FIG. 6 illustrates a flow diagram of an example process for selecting an action to be performed in association with an application based at least in part on policy-violation severity.

FIG. 6 illustrates a flow diagram of an example process 600 for selecting an action to be performed in association with an application based at least in part on policy deviation severity. The order in which the operations or steps are described is not intended to be construed as a limitation, and any number of the described operations may be combined in any order and/or in parallel to implement process 600.

At block 602, the process 600 may include determining a policy-deviation severity score associated with a given application. For example, a permissive deviation component may utilize the violative phrases, the count of violative phrases, and/or the parts of speech and/or anaphora determinations to generate data indicating a severity of content-policy violation(s) associated with given content. Determining policy-violation severity may include, for example, determining and/or identifying an initial severity score associated with a first phrase of the content determined to violate a content policy. In these examples, the first phrase may be associated with a static initial severity score or the severity score may be dynamic and may be based at least in part on the phrase at issue. For example, a phrase determined to correspond to a curse word may have a certain initial severity score while a phrase determined to correspond to a potential infringement violation may have a different initial severity score. By way of further example, phrases corresponding to differing curse words may have varying initial severity scores. The initial severity scores may also be based at least in part on the application from which the content was received and/or a maturity rating associated with the application. For example, a given application associated with healthcare may be more likely to include phrases that would otherwise be considered violative of a content policy if the application was associated with a different application type, such as a children's application. The initial severity scores may be a numerical value, percentage, and/or some other metric and, in examples, may be based at least in part on a scale that indicates a relative severity of the violative phrase. For example, the permissive deviation component may associate an initial severity score of 5 on a scale of 1 to 10 for a given phrase determined to be violative of at least one content policy.

Additionally, the permissive deviation component may be configured to adjust or otherwise change the initial severity score based at least in part on the information queried from the data store. For example, the permissive deviation component may utilize the count of violative phrases to determine whether multiple violative phrases were identified in the content. In examples where at least two violative phrases were identified in the content, the permissive deviation component may be configured to associate a weighting value with the initial severity score. Utilizing the example above, the permissive deviation component may determine that two violative phrases are present with respect to the content, and based at least in part on that determination, the permissive deviation component may increase the initial severity score by, for example, a given percentage. For example, the severity score may be increased by 50% such that the severity score is 7.5 instead of 5. In these examples, the increase in severity score may be based at least in part on the number of violative phrases associated with the content and/or the particular phrases at issue. For example, content having three violative phrases may be associated with a greater severity-score increase than content having two violative phrases. Additionally, content having an additional violative phrase of a first type and/or that is considered more violative than a second type may be associated with a greater severity-score increase.

Additionally, or alternatively, the permissive deviation component may utilize the data associated with the parts of speech and/or anaphoras of the content to determine whether the content includes a pronoun and/or proper noun. In examples where the content includes a pronoun and/or proper noun, the permissive deviation component may be configured to increase the severity score. In these examples, the permissive deviation component may determine that a given violative phrase is being associated with the pronoun and/or proper noun in the content, indicating that the violative phrase is being directed at a person that corresponds to the pronoun and/or proper noun. The permissive deviation component may utilize the anaphora information in a similar way to determine if a violative phrase is being directed to a given person, place, item, etc. By way of example, content corresponding to a user posting may include a curse word and the content may be directing the curse word to a given person. Content such as this may be considered more violative of one or more content policies than content where a violative phrase is not directed to a person, and the permissive deviation component may account for this by increasing the severity score. Utilizing the example above, the initial severity score of 5 may be weighted based at least in part on the presence of the pronoun and/or proper noun and/or the anaphora. By way of example, the initial severity score may be increased by 20% such that the severity score is 6 instead of 5. In examples where the permissive deviation component determines that multiple violative phrases are present and the violative phrases are directed to a person and/or entity, the severity score may be weighted more heavily. For example, the initial severity score may be increased incrementally and/or a given weighting value may be identified and applied to the initial severity score. Some or all of this information may be utilized to determine a policy-violation score associated with the content. The permissive deviation component may also be configured to analyze policy-violation scores associated with a given application over a time period to increase or decrease the severity score. For example, if numerous instances of policy violations are determined over many content instances, the severity score may be increased.

At block 604, the process 600 may include determining whether the policy-deviation severity score satisfies a first threshold severity score. For example, one or more thresholds may be selected to determine which action is to be performed based at least in part on the severity of the policy violation at issue. The first threshold severity score may represent a threshold that, if satisfied, would indicate that a most-severe action should be performed. The threshold severity score may be static or may be dynamic and be based at least in part on historical performance of actions taken, the application at issue, the content at issue, a number of prior actions taken, etc.

If the policy-violation severity score satisfies the first threshold severity score, then at block 606 the process 600 may include causing a first action to be performed in association with the application. For example, the first action may include suppressing the application from being available for use to one or more users.

If the policy-deviation severity score does not satisfy the first threshold severity score, then at block 608 the process 600 may include determining whether the policy-deviation severity score satisfies a second threshold severity score but not the first threshold severity score. As with the first threshold severity score, the second threshold severity score may be static or may be dynamic and be based at least in part on one or more of the factors described above.

If the policy-deviation severity score satisfies the second threshold but not the first threshold, then at block 610 the process 600 may include causing a second action to be performed in association with the application. In examples, the second action may include updating and/or changing a maturity rating associated with the application.

If the policy-violation severity score does not satisfy the second threshold, then at block 612 the process 600 may include causing a third action to be performed in association with the application. In examples, the third action may include generating and/or sending a notification to a user device and/or a client device associated with the application, and/or generating a workflow as described more fully above.

It should be understood that while two thresholds are described with respect to FIG. 6, there may be one, two, or more than two thresholds that may be utilized for determining an action to be performed in association with a given application, device, and/or with respect to given content.

Figure 7:
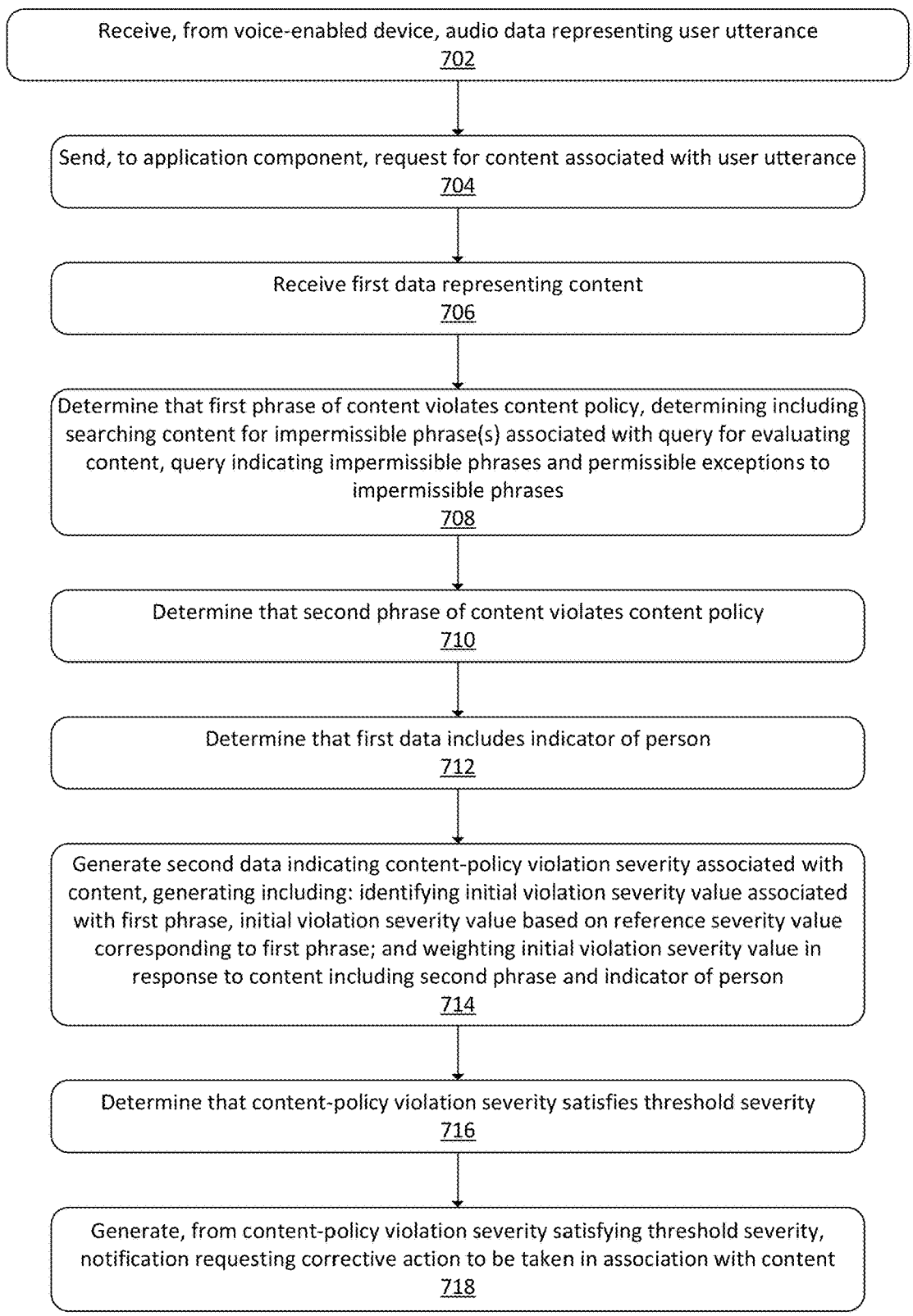
FIG. 7 illustrates a flow diagram of an example process for natural language processing policies.

FIG. 7 illustrates a flow diagram of an example process 700 for natural language processing policies. The order in which the operations or steps are described is not intended to be construed as a limitation, and any number of the described operations may be combined in any order and/or in parallel to implement process 700.

At block 702, the process 700 may include receiving, from a voice-enabled device, audio data representing a user utterance. For example, microphones of an electronic device may receive audio representing the user utterance and may generate corresponding audio data. The electronic device may send the audio data representing the user utterance to a speech-processing system, which may utilize the audio data to determine intent data indicating a determined intent associated with the user utterance. In examples, the user utterance may request particular content. The speech-processing system may determine the requested content and may determine an application configured to and/or designated to retrieve and/or provide the requested content.

At block 704, the process 700 may include sending, to an application component, a request for content associated with the user utterance. For example, a given application and/or skill may be designated as being configured to provide the content being requested and/or to provide a type of content associated with the requested content. The speech-processing system may identify that application and/or skill and may utilize the application and/or skill to request the content from a device and/or system associated with the application. In other examples, the application and/or skill may be associated with the speech-processing system and may be requested from the application component of the speech-processing system, the device from which the request was received, and/or another device.

At block 706, the process 700 may include receiving first data representing the content. For example, the application and/or skill may be utilized to receive the content from a second device. In other examples, the content may be received from the same device that requested the content.

At block 708, the process 700 may include determining that a first phrase of the content violates a content policy, the determining including searching the content for one or more impermissible phrases associated with a query for evaluating the content, the query indicating the impermissible phrases and permissible exceptions to the impermissible phrases. For example, a phrase-management component may be configured to receive content to be evaluated for content-policy violations. The phrase-management component may receive the content as input and determine if one or more phrases of the content violate one or more content policies. For example, the phrase-management component may determine impermissible phrases and/or phrases that are permissible exceptions of what would otherwise be an impermissible phrase. For example, certain previously-defined impermissible phrases and permissible phrases may be associated with given input-data types and/or language indicators. In these examples, once an input-data type and/or language indicator is identified for a given client, that input-data type and/or language indicator may be utilized to identify the impermissible phrases and permissible phrases associated with that input-data type and/or language indicator. The impermissible phrases may represent phrases that violate one or more policies associated with the application, a client device associated with the application, electronic device(s), and/or a remote system. Such phrases may include curse words, inappropriate and/or explicit content, infringing content, etc. The permissible phrases may be phrases that are associated with the impermissible phrases but are considered permissible. For example, an impermissible phrase may be "drug." An associated permissible phrase may be "drug store," which may be both permissible for a given context and/or category of phrases. Additionally, even when a word may be considered impermissible in given circumstances, when the content is of a given type, such as a literary work, the impermissible phrase may be considered permissible. The phrase-management component may also be utilized to determine phrase-evaluation preferences, such as whether a phrase will be considered an impermissible phrase or a permissible phrase when there is an exact match, a broad-phrase match, a fuzzy match, and/or a phonetic match. In addition to the above, the phrase-management component may also be configured to determine a count of violative phrases.

When determining whether one or more phrases of content violate one or more content policies, the phrase-management component may determine a client identifier associated with the application. The client identifier may be associated with generated queries. Those queries may be retrieved and may be utilized to perform phrase evaluation of the content from the application, as described elsewhere herein. The queries corresponding to the client identifier may be retrieved and may be utilized to determine whether violative or otherwise impermissible phrases and/or permissible phrases are present in the content. For example, the content may be percolated into a percolator query, which may be used to compare with queries stored in the data store. The percolator query may contain the content and/or portions of the content. In these examples, the query may include one or more fields, such as a query field used for indexing the query and including a JSON object that represents the query. The query field may be configured as a percolator field type that is configured to store the query in such a way that it can be used to match content defined on the percolator query. The percolator query may be utilized to index the queries associated with the client identifier and percolate the queries to identify which queries match or otherwise correspond to the percolator query. For example, the percolator query may indicate the client identifier for the requested content as well as text data associated with the requested content. Some or all of the queries associated with the client identifier may be utilized to compare the impermissible and permissible phrases associated with those queries and the text data. For example, the queries may indicate one or more impermissible phrases and one or more permissible phrases. The text data may be searched for the impermissible phrases and permissible phrases, and if present, the query associated with the identified impermissible phrases and/or permissible phrases may be identified. The identified query may indicate an association between impermissible phrases and permissible phrases, and that association may be utilized to determine whether an impermissible phrase identified in the content also corresponds to a permissible phrase. In examples where the impermissible phrase corresponds to a permissible phrase, the impermissible phrase may not be censored or otherwise counted as an impermissible phrase. In examples where the impermissible phrase does not correspond to a permissible phrase, the impermissible phrase may be counted as an impermissible phrase and the one or more actions described herein, such as censoring, may be performed.

At block 710, the process 700 may include determining that a second phrase of the content violates the content policy. Determining that the second phrase violates the content policy may be performed in the same or a similar manner as determining that a first phrase violates the content policy and/or another content policy.

At block 712, the process 700 may include determining that the first data includes an indicator of a person. For example, a phrase evaluator may be configured to perform one or more evaluations of the content and/or the results from the phrase-management component to generate additional data to be utilized for violation severity determinations for natural language processing. For example, the phrase evaluator may utilize the content and/or the results from the phrase-management component to determine parts of speech of words of the content. For example, the phrase evaluator may be configured to determine if one or more pronouns are present in the content, if one or more proper nouns are present in the content, whether the content includes adjectives and/or which nouns are being modified by the adjectives, and/or whether a given word is a noun or a verb, which may be determined based on its disposition in a sentence, for example. Additionally, in examples, the phrase evaluator may be configured to determine if the content includes one or more anaphoras, which are words that refer to or replace a word used earlier in a given sentence and/or a prior sentence. For example, the sentence "Restaurant A has great food, and it is close" includes the anaphora "it" for the word "Restaurant A." The phrase evaluator may generate a JSON document that indicates the determined parts of speech and/or anaphoras. This JSON document may be stored in association with the data store.

At block 714, the process 700 may include generating second data indicating a content-policy violation severity associated with the content, the generating including: identifying an initial violation severity value associated with the first phrase, the initial violation severity value based on a reference severity value corresponding to the first phrase; and weighting the initial violation severity value in response to the content including the second phrase and the indicator of the person. For example, a permissive deviation component may utilize the violative phrases, the count of violative phrases, and/or the parts of speech and/or anaphora determinations to generate data indicating a severity of content-policy violation(s) associated with given content. Determining policy-violation severity may include, for example, determining and/or identifying an initial severity score associated with a first phrase of the content determined to violate a content policy. In these examples, the first phrase may be associated with a static initial severity score or the severity score may be dynamic and may be based at least in part on the phrase at issue. For example, a phrase determined to correspond to a curse word may have a certain initial severity score while a phrase determined to correspond to a potential infringement violation may have a different initial severity score. By way of further example, phrases corresponding to differing curse words may have varying initial severity scores. The initial severity scores may also be based at least in part on the application from which the content was received and/or a maturity rating associated with the application. For example, a given application associated with healthcare may be more likely to include phrases that would otherwise be considered violative of a content policy if the application was associated with a different application type, such as a children's application. The initial severity scores may be a numerical value, percentage, and/or some other metric and, in examples, may be based at least in part on a scale that indicates a relative severity of the violative phrase. For example, the permissive deviation component may associate an initial severity score of 5 on a scale of 1 to 10 for a given phrase determined to be violative of at least one content policy.

Additionally, the permissive deviation component may be configured to adjust or otherwise change the initial severity score based at least in part on the information queried from the data store. For example, the permissive deviation component may utilize the count of violative phrases to determine whether multiple violative phrases were identified in the content. In examples where at least two violative phrases were identified in the content, the permissive deviation component may be configured to associate a weighting value with the initial severity score. Utilizing the example above, the permissive deviation component may determine that two violative phrases are present with respect to the content, and based at least in part on that determination, the permissive deviation component may increase the initial severity score by, for example, a given percentage. For example, the severity score may be increased by 50% such that the severity score is 7.5 instead of 5. In these examples, the increase in severity score may be based at least in part on the number of violative phrases associated with the content and/or the particular phrases at issue. For example, content having three violative phrases may be associated with a greater severity-score increase than content having two violative phrases. Additionally, content having an additional violative phrase of a first type and/or that is considered more violative than a second type may be associated with a greater severity-score increase.

Additionally, or alternatively, the permissive deviation component may utilize the data associated with the parts of speech and/or anaphoras of the content to determine whether the content includes a pronoun and/or proper noun. In examples where the content includes a pronoun and/or proper noun, the permissive deviation component may be configured to increase the severity score. In these examples, the permissive deviation component may determine that a given violative phrase is being associated with the pronoun and/or proper noun in the content, indicating that the violative phrase is being directed at a person that corresponds to the pronoun and/or proper noun. The permissive deviation component may utilize the anaphora information in a similar way to determine if a violative phrase is being directed to a given person, place, item, etc. By way of example, content corresponding to a user posting may include a curse word and the content may be directing the curse word to a given person. Content such as this may be considered more violative of one or more content policies than content where a violative phrase is not directed to a person, and the permissive deviation component may account for this by increasing the severity score. Utilizing the example above, the initial severity score of 5 may be weighted based at least in part on the presence of the pronoun and/or proper noun and/or the anaphora. By way of example, the initial severity score may be increased by 20% such that the severity score is 6 instead of 5. In examples where the permissive deviation component determines that multiple violative phrases are present and the violative phrases are directed to a person and/or entity, the severity score may be weighted more heavily. For example, the initial severity score may be increased incrementally and/or a given weighting value may be identified and applied to the initial severity score. Some or all of this information may be utilized to determine a policy-violation score associated with the content. The permissive deviation component may also be configured to analyze policy-violation scores associated with a given application over a time period to increase or decrease the severity score. For example, if numerous instances of policy violations are determined over many content instances, the severity score may be increased.

At block 716, the process 700 may include determining that the content-policy violation severity satisfies a threshold severity. For example, one or more thresholds may be selected to determine which action is to be performed based at least in part on the severity of the policy violation at issue. The first threshold severity score may represent a threshold that, if satisfied, would indicate that a most-severe action should be performed. The threshold severity score may be static or may be dynamic and be based at least in part on historical performance of actions taken, the application at issue, the content at issue, a number of prior actions taken, etc.

At block 718, the process 700 may include generating, from the content-policy violation severity satisfying the threshold severity, a notification requesting corrective action to be taken in association with the content. The process 700 may also include sending the notification. In examples, the notification may be sent to a second device associated with the application component. In other examples, the notification may be sent as between components of the same device.

Additionally, or alternatively, the process 700 may include generating third data indicating a second content-policy violation severity associated with second content received from a second application component. The process 700 may also include determining that the second content-policy violation severity indicates more severity than the first content-policy violation severity. The process 700 may also include causing, from the second content-policy violation severity being more severe than the first content-policy violation severity, an action to be performed in association with the second application component prior to generating the notification.

Additionally, or alternatively, the process 700 may include determining a severity value associated with the first phrase. The process 700 may also include determining a first weighted severity value from the content including more than one phrase that violates the content policy. The process 700 may also include determining a second weighted severity value from the content including the indicator of the person. In these examples, determining the content-policy violation severity may include utilizing the second weighted severity value.

Additionally, or alternatively, the process 700 may include determining a threshold amount of time for corrective action to be taken in response to notifications. The process 700 may also include identifying an amount of time since a prior notification was sent to the second device requesting corrective action. The process 700 may also include determining that the amount of time is more than the threshold amount of time. In these examples, sending the notification to the second device may be in response to the amount of time being more than the threshold amount of time.

Figure 8:
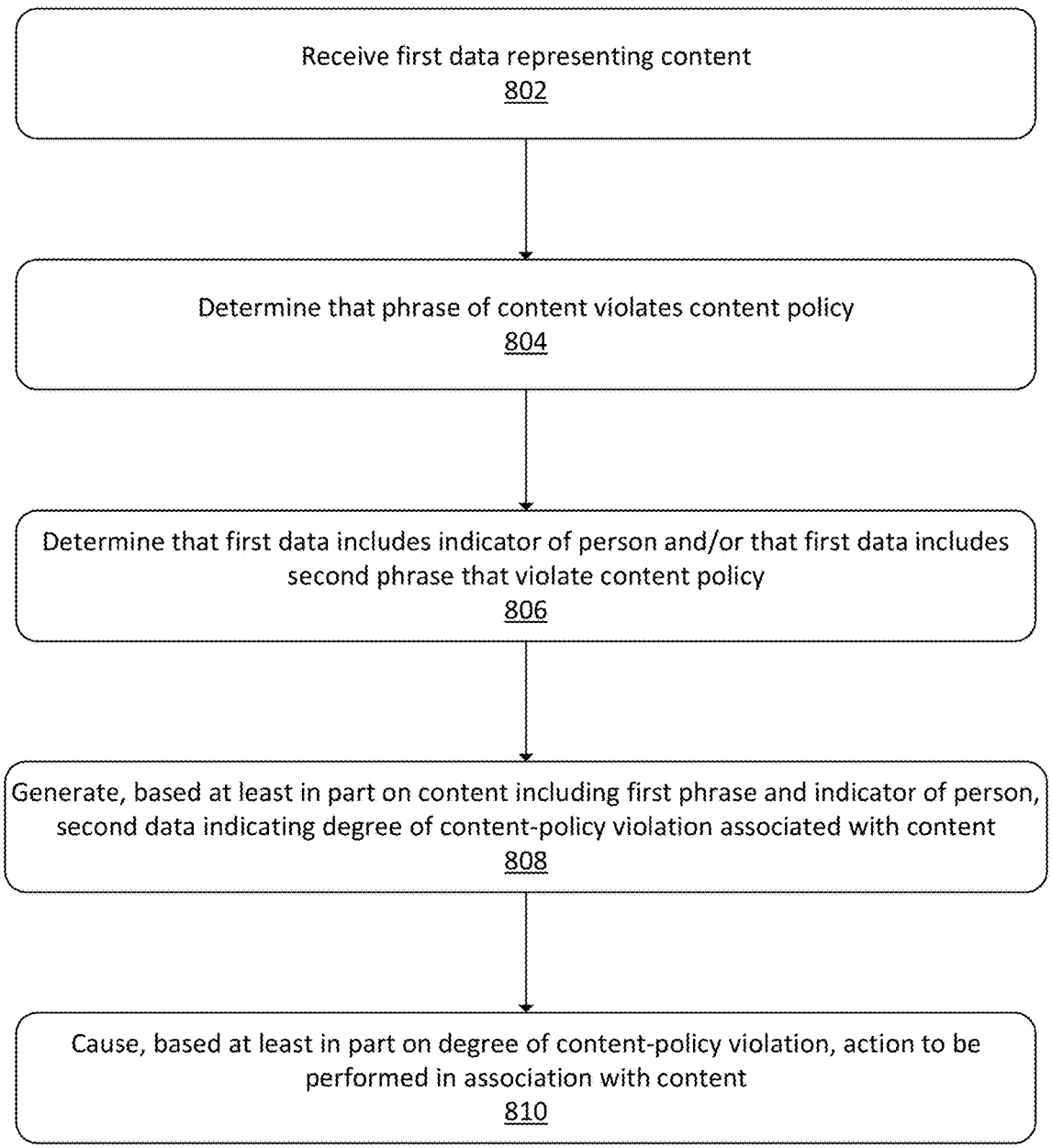
FIG. 8 illustrates a flow diagram of another example process for natural language processing policies.

FIG. 8 illustrates a flow diagram of another example process 800 for natural language processing policies. The order in which the operations or steps are described is not intended to be construed as a limitation, and any number of the described operations may be combined in any order and/or in parallel to implement process 800.

At block 802, the process 800 may include receiving first data representing content. For example, microphones of an electronic device may receive audio representing the user utterance and may generate corresponding audio data. The electronic device may send the audio data representing the user utterance to a speech-processing system, which may utilize the audio data to determine intent data indicating a determined intent associated with the user utterance. In examples, the user utterance may request particular content. The speech-processing system may determine the requested content and may determine an application configured to and/or designated to retrieve and/or provide the requested content. A given application and/or skill may be designated as being configured to provide the content being requested and/or to provide a type of content associated with the requested content. The speech-processing system may identify that application and/or skill and may utilize the application and/or skill to request the content from a device and/or system associated with the application. For example, an application and/or skill may be utilized to receive the content from the second device. In other examples, the content may be received from a user device and/or another device and that content may not be in response to a request for the content.

At block 804, the process 800 may include determining that a phrase of the content violates a content policy. For example, a phrase-management component may be configured to receive content to be evaluated for content-policy violations. The phrase-management component may receive the content as input and determine if one or more phrases of the content violate one or more content policies. For example, the phrase-management component may determine impermissible phrases and/or phrases that are permissible exceptions of what would otherwise be an impermissible phrase. For example, certain previously-defined impermissible phrases and permissible phrases may be associated with given input-data types and/or language indicators. In these examples, once an input-data type and/or language indicator is identified for a given client, that input-data type and/or language indicator may be utilized to identify the impermissible phrases and permissible phrases associated with that input-data type and/or language indicator. The impermissible phrases may represent phrases that violate one or more policies associated with the application, a client device associated with the application, electronic device(s), and/or a remote system. Such phrases may include curse words, inappropriate and/or explicit content, infringing content, etc. The permissible phrases may be phrases that are associated with the impermissible phrases but are considered permissible. For example, an impermissible phrase may be "drug." An associated permissible phrase may be "drug store," which may be both permissible for a given context and/or category of phrases. Additionally, even when a word may be considered impermissible in given circumstances, when the content is of a given type, such as a literary work, the impermissible phrase may be considered permissible. The phrase-management component may also be utilized to determine phrase-evaluation preferences, such as whether a phrase will be considered an impermissible phrase or a permissible phrase when there is an exact match, a broad-phrase match, a fuzzy match, and/or a phonetic match. In addition to the above, the phrase-management component may also be configured to determine a count of violative phrases.

When determining whether one or more phrases of content violate one or more content policies, the phrase-management component may determine a client identifier associated with the application. The client identifier may be associated with generated queries. Those queries may be retrieved and may be utilized to perform phrase evaluation of the content from the application, as described elsewhere herein. The queries corresponding to the client identifier may be retrieved and may be utilized to determine whether violative or otherwise impermissible phrases and/or permissible phrases are present in the content. For example, the content may be percolated into a percolator query, which may be used to compare with queries stored in the data store. The percolator query may contain the content and/or portions of the content. In these examples, the query may include one or more fields, such as a query field used for indexing the query and including a JSON object that represents the query. The query field may be configured as a percolator field type that is configured to store the query in such a way that it can be used to match content defined on the percolator query. The percolator query may be utilized to index the queries associated with the client identifier and percolate the queries to identify which queries match or otherwise correspond to the percolator query. For example, the percolator query may indicate the client identifier for the requested content as well as text data associated with the requested content. Some or all of the queries associated with the client identifier may be utilized to compare the impermissible and permissible phrases associated with those queries and the text data. For example, the queries may indicate one or more impermissible phrases and one or more permissible phrases. The text data may be searched for the impermissible phrases and permissible phrases, and if present, the query associated with the identified impermissible phrases and/or permissible phrases may be identified. The identified query may indicate an association between impermissible phrases and permissible phrases, and that association may be utilized to determine whether an impermissible phrase identified in the content also corresponds to a permissible phrase. In examples where the impermissible phrase corresponds to a permissible phrase, the impermissible phrase may not be censored or otherwise counted as an impermissible phrase. In examples where the impermissible phrase does not correspond to a permissible phrase, the impermissible phrase may be counted as an impermissible phrase and the one or more actions described herein, such as censoring, may be performed. The process 800 may also include associating a first severity value with the first phrase.

At block 806, the process 800 may include determining that the first data includes an indicator of a person and/or determining that the first data includes a second phrase that violates the content policy and/or another content policy. For example, a phrase evaluator may be configured to perform one or more evaluations of the content and/or the results from the phrase-management component to generate additional data to be utilized for violation severity determinations for natural language processing. For example, the phrase evaluator may utilize the content and/or the results from the phrase-management component to determine parts of speech of words of the content. For example, the phrase evaluator may be configured to determine if one or more pronouns are present in the content, if one or more proper nouns are present in the content, whether the content includes adjectives and/or which nouns are being modified by the adjectives, and/or whether a given word is a noun or a verb, which may be determined based on its disposition in a sentence, for example. Additionally, in examples, the phrase evaluator may be configured to determine if the content includes one or more anaphoras, which are words that refer to or replace a word used earlier in a given sentence and/or a prior sentence. For example, the sentence "Restaurant A has great food, and it is close" includes the anaphora "it" for the word "Restaurant A." The phrase evaluator may generate a JSON document that indicates the determined parts of speech and/or anaphoras. This JSON document may be stored in association with the data store.

At block 808, the process 800 may include generating, based at least in part on the content including the first phrase and the indicator of the person, second data indicating a degree of content-policy violation associated with the content. The process 800 may also include generating, based at least in part on the first severity value and the content including the second phrase, the second data indicating the degree of content-policy violation associate with the content. For example, a permissive deviation component may utilize the violative phrases, the count of violative phrases, and/or the parts of speech and/or anaphora determinations to generate data indicating a severity of content-policy violation(s) associated with given content. Determining policy-violation severity may include, for example, determining and/or identifying an initial severity score associated with a first phrase of the content determined to violate a content policy. In these examples, the first phrase may be associated with a static initial severity score or the severity score may be dynamic and may be based at least in part on the phrase at issue. For example, a phrase determined to correspond to a curse word may have a certain initial severity score while a phrase determined to correspond to a potential infringement violation may have a different initial severity score. By way of further example, phrases corresponding to differing curse words may have varying initial severity scores. The initial severity scores may also be based at least in part on the application from which the content was received and/or a maturity rating associated with the application. For example, a given application associated with healthcare may be more likely to include phrases that would otherwise be considered violative of a content policy if the application was associated with a different application type, such as a children's application. The initial severity scores may be a numerical value, percentage, and/or some other metric and, in examples, may be based at least in part on a scale that indicates a relative severity of the violative phrase. For example, the permissive deviation component may associate an initial severity score of 5 on a scale of 1 to 10 for a given phrase determined to be violative of at least one content policy.

Additionally, the permissive deviation component may be configured to adjust or otherwise change the initial severity score based at least in part on the information queried from the data store. For example, the permissive deviation component may utilize the count of violative phrases to determine whether multiple violative phrases were identified in the content. In examples where at least two violative phrases were identified in the content, the permissive deviation component may be configured to associate a weighting value with the initial severity score. Utilizing the example above, the permissive deviation component may determine that two violative phrases are present with respect to the content, and based at least in part on that determination, the permissive deviation component may increase the initial severity score by, for example, a given percentage. For example, the severity score may be increased by 50% such that the severity score is 7.5 instead of 5. In these examples, the increase in severity score may be based at least in part on the number of violative phrases associated with the content and/or the particular phrases at issue. For example, content having three violative phrases may be associated with a greater severity-score increase than content having two violative phrases. Additionally, content having an additional violative phrase of a first type and/or that is considered more violative than a second type may be associated with a greater severity-score increase.

Additionally, or alternatively, the permissive deviation component may utilize the data associated with the parts of speech and/or anaphoras of the content to determine whether the content includes a pronoun and/or proper noun. In examples where the content includes a pronoun and/or proper noun, the permissive deviation component may be configured to increase the severity score. In these examples, the permissive deviation component may determine that a given violative phrase is being associated with the pronoun and/or proper noun in the content, indicating that the violative phrase is being directed at a person that corresponds to the pronoun and/or proper noun. The permissive deviation component may utilize the anaphora information in a similar way to determine if a violative phrase is being directed to a given person, place, item, etc. By way of example, content corresponding to a user posting may include a curse word and the content may be directing the curse word to a given person. Content such as this may be considered more violative of one or more content policies than content where a violative phrase is not directed to a person, and the permissive deviation component may account for this by increasing the severity score. Utilizing the example above, the initial severity score of 5 may be weighted based at least in part on the presence of the pronoun and/or proper noun and/or the anaphora. By way of example, the initial severity score may be increased by 20% such that the severity score is 6 instead of 5. In examples where the permissive deviation component determines that multiple violative phrases are present and the violative phrases are directed to a person and/or entity, the severity score may be weighted more heavily. For example, the initial severity score may be increased incrementally and/or a given weighting value may be identified and applied to the initial severity score. Some or all of this information may be utilized to determine a policy-violation score associated with the content. The permissive deviation component may also be configured to analyze policy-violation scores associated with a given application over a time period to increase or decrease the severity score. For example, if numerous instances of policy violations are determined over many content instances, the severity score may be increased.

At block 810, the process 800 may include causing, based at least in part on the degree of content-policy violation, an action to be performed in association with the content. The application-management component may be configured to receive the policy-violation score and may associate the score with the application from which the content was received and/or directed. The application-management component may also receive additional policy-violation scores associated with one or more other applications. The application-management component may utilize the policy-violation scores to rank the applications from those associated with the most severe content-policy violations to those associated with the least severe content-policy violations. The application-management component may then determine one or more actions to be performed in association with the applications, determining and/or performing actions on the applications with the most severe violations prior to determining and/or performing actions on applications with less severe violations. The application-management component may also utilize the policy-violation score associated with a given application to determine which action to perform in association with the application. For example, the actions may include sending a communication, such as via a communication component, to a client device associated with the application. The communication may indicate that the content violates one or more content policies and request that corrective action be taken.

The actions may additionally, or alternatively, include sending a communication, such as via the communication component, to a user device that requested the content and/or that provided the content. The communication may indicate that the content violates one or more content polices and may include a version of the content with the violative phrase(s) redacted and/or an indication that the content cannot be displayed and/or output because it violates a content policy. The actions may additionally, or alternatively, include updating or otherwise changing a maturity rating associated with the application. For example, an initial maturity rating for a given application may indicate that the application is appropriate for all audiences, including children. Based at least in part on the results from the permissive deviation component, the action may include updating the maturity rating to indicate that the application is not appropriate for children and/or is appropriate for only certain audiences. The action may additionally, or alternatively, include suppressing the application from being utilized by users or a given group of users and/or from being included in a catalog and/or listing of applications available for use. The action may additionally, or alternatively, include generation of a workflow associated with the application. The workflow may include instructions and/or requests for result validation, such as by a developer and/or tester of the application before further action may be initiated utilizing the application.

Additionally, or alternatively, the application-management component may include one or more filters to be utilized prior to, in examples, taking action with respect to a given application. For example, a "cool-off" filter may be utilized to determine whether an action has been taken with respect to an application within a given period of time. If a threshold period of time has not elapsed since a prior action, such as sending a notification, was taken, the application-management component may determine to refrain from taking another action until the threshold period of time has elapsed. In examples, this filter may be utilized for determining when to take an action of the same or a similar type as a prior action and/or the filter may be utilized for determining when to take any action. The threshold period of time may be static, and/or may be based at least in part on the prior action taken, the application that the action is being performed in association with, a number of prior actions taken, an amount of user interaction with the application, and/or other data associated with the content, the application, and/or use of the application. The filters may also include, in examples, a "capacity" filter, which may be utilized to determine the number of applications that may be flagged for actions in a given time period and/or run. The number of applications may be based at least in part on compute usage, user interaction with available applications, a time of day, and/or a day of the week, for example.

Additionally, or alternatively, the process 800 may include generating third data indicating a second degree of content-policy violation associated with second content receiving from a second application component, where the first content was received from a first application component. The process 800 may also include determining that the second degree of content-policy violation is more severe than the first degree of content-policy violation. The process 800 may also include causing, based at least in part on the second degree of content-policy violation being more severe than the first degree of content-policy violation, a second action to be performed in association with the second application component prior to causing the first action to be performed in association with the first application component.

Additionally, or alternatively, the process 800 may include determining a severity value associated with the phrase and determining a weighted severity value based at least in part on the content including the indicator of the person. In these examples, determining the degree of content-policy violation comprises may be based at least in part on the weighted severity value.

Additionally, or alternatively, the process 800 may include determining a threshold amount of time for taking corrective action associated with content-policy violations. The process 800 may also include identifying an amount of time since a prior action was performed in association with a device from which the content was received. The process 800 may also include determining that the amount of time is more than the threshold amount of time. In these examples, causing the action to be performed may be based at least in part on the amount of time being more than the threshold amount of time.

Additionally, or alternatively, the process 800 may include determining that the degree of content-policy violation satisfies a threshold degree. The process 800 may also include generating, based at least in part on the degree of content-policy violation satisfying the threshold degree, a notification requesting corrective action to be taken in association with the content. In these examples, causing the action to be performed may include sending the notification to a device from which the content was received.

Additionally, or alternatively, the process 800 may include determining that an application associated with the content is associated with a first maturity rating. The process 800 may also include determining that the degree of content-policy violation satisfies a threshold degree. The process 800 may also include determining, based at least in part on the degree of content-policy violation satisfying the threshold degree of content-policy violation, that the application is to be associated with a second maturity rating. In these examples, causing the action to be performed may include associating the application with the second maturity rating instead of the first maturity rating.

Additionally, or alternatively, the process 800 may include determining a number of content-policy violations associated with an application from which the content was received. The process 800 may also include determining that the number of content-policy violations satisfies a threshold number of content-policy violations. In these examples, causing the action to be performed may include causing the application to be removed from a listing of available applications based at least in part on the number of content-policy violations satisfying the threshold number of content-policy violations.

Figure 9:
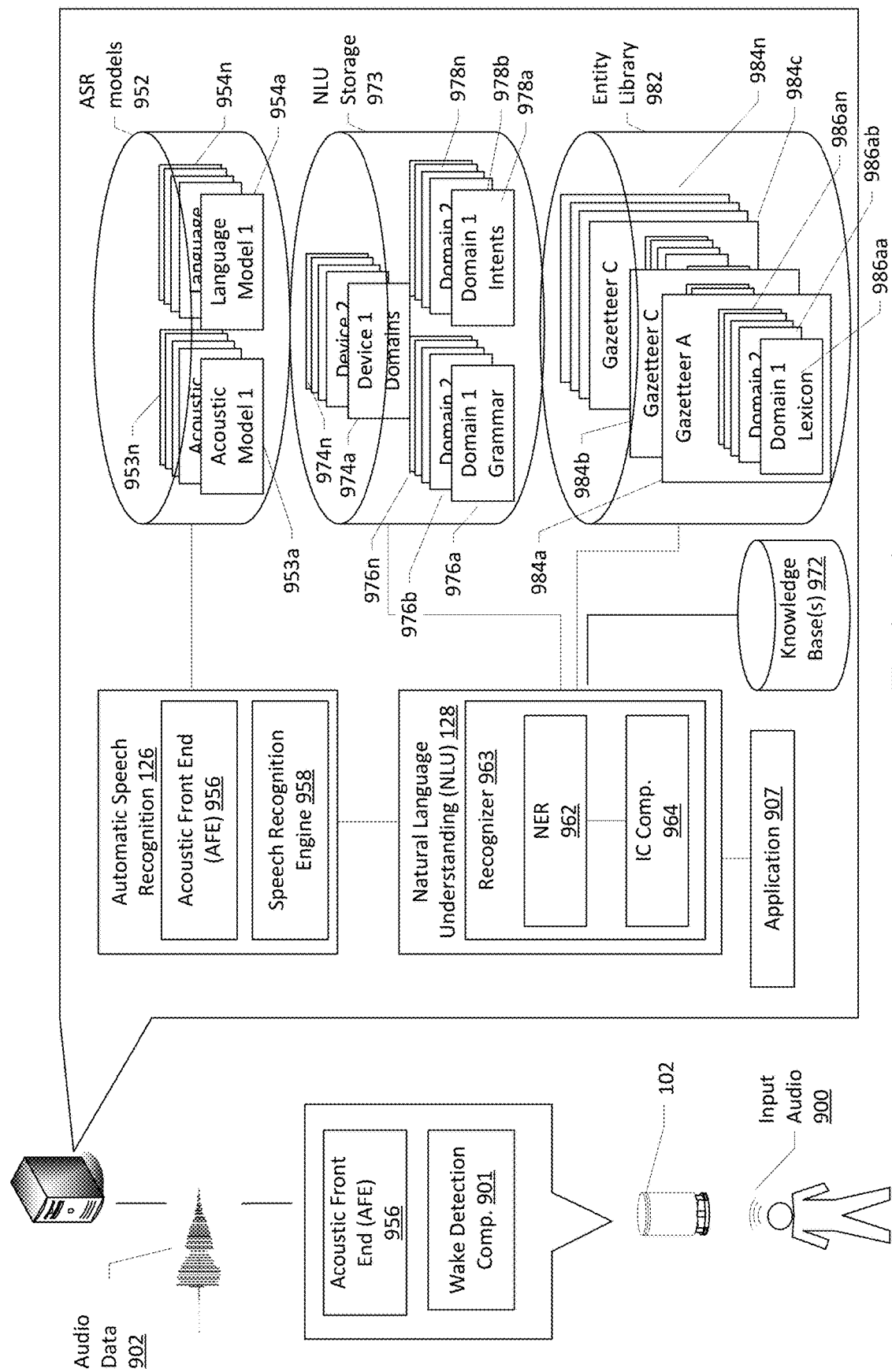
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same device or different physical devices. Message between various components illustrated in FIG. 9 may occur directly or across a network 110. An audio capture component, such as a microphone 116 of the device 102, or another device, captures audio 900 corresponding to a spoken utterance. The device 102, using a wake-word component 901, then processes audio data corresponding to the audio 900 to determine if a keyword (such as a wakeword) is detected in the audio data. Following detection of a wakeword, the device 102 sends audio data 902 corresponding to the utterance to the remote system 106 that includes an ASR component 126. The audio data 902 may be output from an optional acoustic front end (AFE) 956 located on the device prior to transmission. In other instances, the audio data 902 may be in a different form for processing by a remote AFE 956, such as the AFE 956 located with the ASR component 126 of the remote system 106.

The wake-word component 901 works in conjunction with other components of the user device, for example a microphone to detect keywords in audio 900. For example, the device may convert audio 900 into audio data, and process the audio data with the wake-word component 901 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake-word component 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 902 corresponding to input audio 900 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 902 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 106, an ASR component 126 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 126 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956) and transmit that information to a server across a network for ASR processing. Feature vectors may arrive at the remote system 106 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, what is the title of this song?" The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 958 may identify, determine, and/or generate text data corresponding to the user utterance, here "what is the title of this song."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 128 (e.g., server 106) may include various components, including potentially dedicated processor(s), memory, storage, etc. As shown in FIG. 9, an NLU component 156 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as electronic devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 126 based on the utterance input audio 900) and attempts to make a semantic interpretation of the text. That is, the NLU process determines the meaning behind the text based on the individual words and then implements that meaning. NLU processing 128 interprets a text string to derive an intent or a desired action from the user as well as the pertinent pieces of information in the text that allow a device (e.g., device 102) to complete that action. For example, if a spoken utterance is processed using ASR 126 and outputs the text "what is the title of this song" the NLU process may determine that the user intended to receive information indicating the title of a song being output by a device 102.

The NLU may process several textual inputs related to the same utterance. For example, if the ASR 126 outputs N text segments (as part of an N-best list), the NLU may process all N outputs to obtain NLU results.

As will be discussed further below, the NLU process may be configured to parse and tag to annotate text as part of NLU processing. For example, for the text "what is the title of this song," "identify title" may be tagged as a command (to identify the title of a song) and "this song" may be tagged as the naming identifier of the song.

To correctly perform NLU processing of speech input, an NLU process 128 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 128 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "song title" is an identified intent, a grammar (976) framework or frameworks may correspond to sentence structures such as "identify {this song} song title."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song," meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to an application 907. The destination application 907 may be determined based on the NLU output. For example, if the NLU output includes a command to send a message, the destination application 907 may be a message sending application, such as one located on the user device or in a message sending appliance, configured to execute a message sending command. If the NLU output includes a search request, the destination application 907 may include a search engine processor, such as one located on a search server, configured to execute a search command. After the appropriate command is generated based on the intent of the user, the application 907 may provide some or all of this information to a text-to-speech (TTS) engine. The TTS engine may then generate an actual audio file for outputting the audio data determined by the application 907 (e.g., "okay," or "this song title is Song A"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 128 during runtime operations where NLU operations are performed on text (such as text output from an ASR component 126). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 106 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 10:
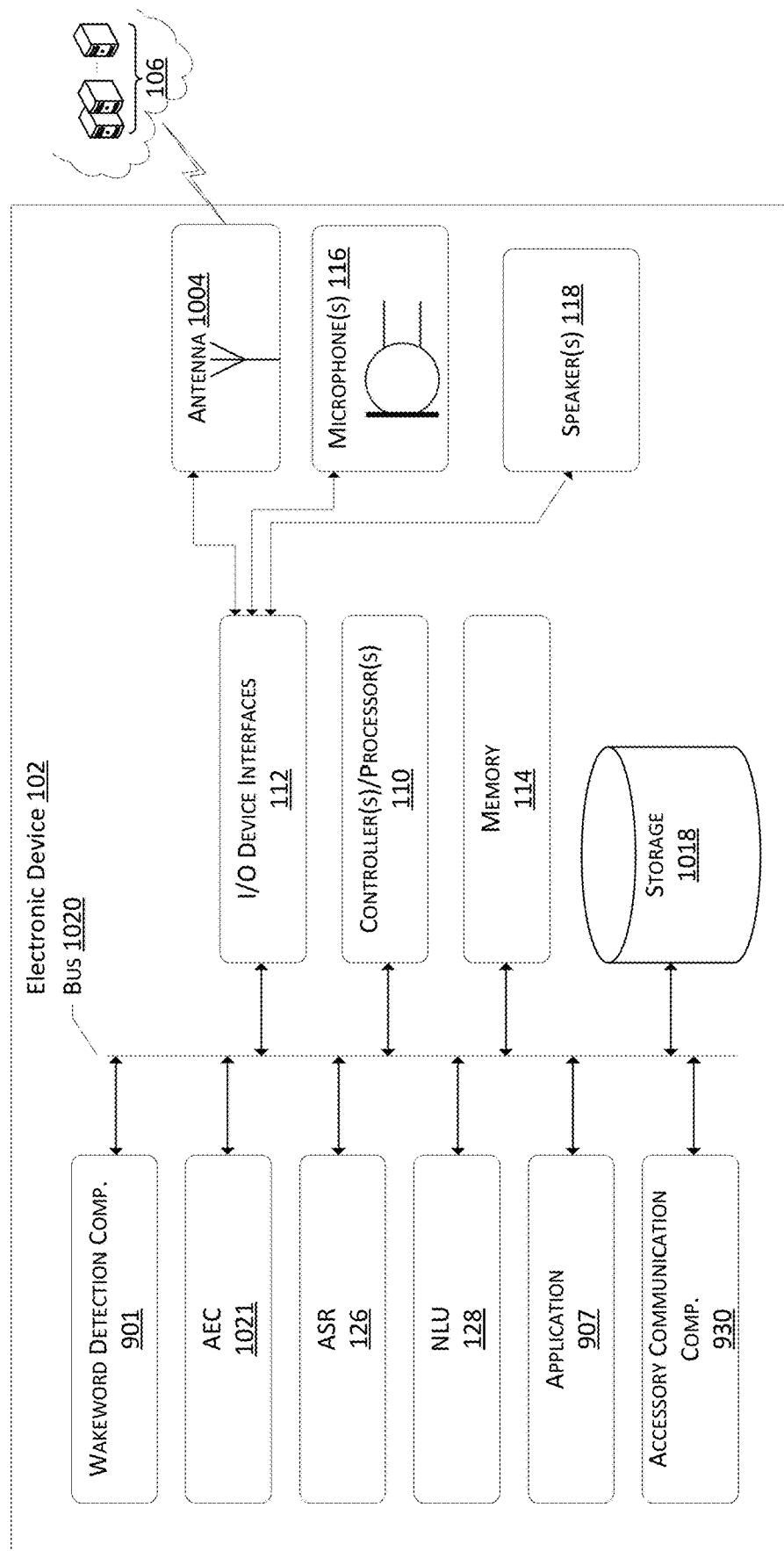
FIG. 10 illustrates a conceptual diagram of example components of a computing device involved in natural language processing policies.

FIG. 10 illustrates a conceptual diagram of example components of computing device involved in natural language processing policies. The computing device, which may include an electronic device 102 may be implemented as a standalone device that is relatively simple in terms of functional capabilities with limited input/output components, memory, and processing capabilities. For instance, the computing device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 116, a power source, and functionality for sending generated audio data via one or more antennas 1004 to another device and/or system.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the non-master device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 116, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 10 may include one or more controllers/processors 110, that may include a central processing unit (CPU) for processing data and computer-readable instructions, and memory 114 for storing data and instructions of the device 102. In examples, the skills and/or applications described herein may be stored in association with the memory 114, which may be queried for content and/or responses as described herein. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as temporary "working" storage at runtime. A device's computer instructions may be stored in a non-transitory manner in non-volatile memory 114, storage 1018, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 1020 for conveying data among components of the respective device. Each component within a device 102 may also be directly connected to other components in addition to, or instead of, being connected to other components across the bus 1020.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 110 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102 (using microphone 116, wakeword detection component 901, ASR component 126, etc.) may be configured to generate audio data corresponding to captured audio. The device 102 (using input/output device interfaces 112, antenna 1004, etc.) may also be configured to transmit the audio data to the remote system 106 for further processing or to process the data using internal components such as a wakeword detection component 901.

Via the antenna(s) 1004, the input/output device interface 112 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s), the speech-processing system may be distributed across a networked environment. Accordingly, the device 102 and/or the remote system 106 may include an ASR component 126. The ASR component 126 of device 102 may be of limited or extended capabilities. The ASR component 126 may include language models stored in ASR model storage component, and an ASR component 126 that performs automatic speech recognition. If limited speech recognition is included, the ASR component 126 may be configured to identify a limited number of words, such as keywords detected by the device, whereas extended speech recognition may be configured to recognize a much larger range of words.

The device 102 and/or the remote system 106 may include a limited or extended NLU component 128. The NLU component 128 of device 102 may be of limited or extended capabilities. The NLU component 128 may comprise a name entity recognition module, an intent classification module and/or other components. The NLU component 128 may also include a stored knowledge base and/or entity library, or those storages may be separately located.

In examples, AEC may also be performed by the device 102. In these examples, the operations may include causing the AEC component 1021 to be enabled or otherwise turned on, or the operations may include causing the AEC component 1021 to transition from a first mode to a second mode representing a higher sensitivity to audio data generated by the microphone 116. The AEC component 1021 may utilize the audio data generated by the microphone 116 to determine if an audio fingerprint of the audio data, or portion thereof, corresponds to a reference audio fingerprint associated with the predefined event.

The device 102 and/or the remote system 106 may also include an application 907 that is configured to execute commands/functions associated with a spoken command as described herein. The device 102 may include a wakeword detection component 901, which may be a separate component or may be included in an ASR component 126. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method, comprising:
receiving first user input data indicating selection of a content policy of multiple content policies to apply in association with account data;
determining first data representing a content was received in association with request data sent from a device associated with the account data;
applying the content policy to the first data based at least in part on the request data being sent from the device associated with the account data;
determining that a first phrase of the content violates the content policy;
determining that the first data includes an indicator of a predefined subject;
generating, based at least in part on the content including the first phrase and the indicator of the predefined subject, second data indicating a degree of content-policy violation associated with the content; and
causing, based at least in part on the degree of content-policy violation, an action to be performed in association with the content.

2. The method of claim 1, further comprising:
receiving second user input data identifying a condition to be associated with the content policy;
detecting the condition from the first data; and
wherein causing the action to be performed comprises causing the action to be performed based at least in part on detecting the condition.

3. The method of claim 1, wherein the predefined subject is associated with a political reference.

4. The method of claim 1, wherein the predefined subject is associated with a religious reference.

5. The method of claim 1, further comprising:
determining a severity value associated with the first phrase; and
wherein determining the degree of content-policy violation comprises determining the degree of content-policy violation based at least in part on the severity value.

6. The method of claim 1, further comprising:
determining that a second phrase of the content violates the content policy; and
wherein generating the second data indicating the degree of content-policy violation comprises generating the second data based at least in part on the content including the second phrase.

7. The method of claim 1, further comprising:
determining that an application associated with the content is associated with a first maturity rating; and
wherein causing the action to be performed comprises associating the application with a second maturity rating instead of the first maturity rating based at least in part on the first data including the indicator of the predefined subject.

8. The method of claim 1, further comprising:
determining a number of content-policy violations associated with an application from which the content was received; and
wherein causing the action to be performed comprises causing the application to be removed from a listing of available applications based at least in part on the number of content-policy violations.

9. A system comprising:
one or more processors; and
non-transitory computer-readable media storing instructions that, when executed by the one or more processors, cause the one or more processors to perform operations comprising:
receiving first data representing content;
determining that a first phrase of the content violates a content policy;
determining that the first data includes an indicator of a predefined subject;
generating, based at least in part on the content including the first phrase and the indicator of the predefined subject, second data indicating a degree of content-policy violation associated with the content;
determining that an application associated with the content is associated with a first maturity rating; and
causing, based at least in part on the degree of content-policy violation, an action to be performed in association with the content, wherein the action comprises at least associating the application with a second maturity rating instead of the first maturity rating.

10. The system of claim 9, the operations further comprising:
receiving user input data indicating selection of the content policy of multiple content policies to apply in association with account data;
determining the first data was received in association with request data sent from a device associated with the account data; and
applying the content policy based at least in part on the request data being sent from the device associated with the account data.

11. The system of claim 9, the operations further comprising:
receiving user input data identifying a condition to be associated with the content policy;
detecting the condition from the first data; and
wherein causing the action to be performed comprises causing the action to be performed based at least in part on detecting the condition.

12. The system of claim 9, wherein the predefined subject is associated with a political reference.

13. The system of claim 9, wherein the predefined subject is associated with a religious reference.

14. The system of claim 9, the operations further comprising:
determining a severity value associated with the first phrase; and
wherein determining the degree of content-policy violation comprises determining the degree of content-policy violation based at least in part on the severity value.

15. The system of claim 9, the operations further comprising:
determining that a second phrase of the content violates the content policy; and
wherein generating the second data indicating the degree of content-policy violation comprises generating the second data indicating the degree of content-policy violation based at least in part on the content including the second phrase.

16. The system of claim 9, the operations further comprising:
  determining a number of content-policy violations associated with the application from which the content was received; and
  causing the application to be removed from a listing of available applications based at least in part on the number of content-policy violations.

17. The system of claim 9, the operations further comprising:
  receiving an indication of a device to receive the first data; and
  selecting the content policy from multiple content policies based at least in part on the device to receive the first data.

18. The method of claim 1, wherein the action includes prohibiting the content from being sent to the device.

19. The method of claim 1, wherein the action includes sending the content to the device without the first phrase.

20. The system of claim 9, the operations further comprising selecting the content policy from multiple content policies based at least in part on account data associated with the first data.

* * * * *